US012555740B2

(12) United States Patent
Martinez Negrete Gasque et al.

(10) Patent No.: US 12,555,740 B2
(45) Date of Patent: Feb. 17, 2026

(54) CHARGED PARTICLE SYSTEM, APERTURE ARRAY, CHARGED PARTICLE TOOL AND METHOD OF OPERATING A CHARGED PARTICLE SYSTEM

(71) Applicant: ASML Netherlands B.V., Veldhoven (NL)

(72) Inventors: Diego Martinez Negrete Gasque, Delft (NL); Vincent Claude Beugin, Nootdorp (NL); Weihua Yin, San Jose, CA (US)

(73) Assignee: ASML Netherlands B.V., Veldhoven (NL)

( * ) Notice: Subject to any disclaimer, the term of this patent is extended or adjusted under 35 U.S.C. 154(b) by 542 days.

(21) Appl. No.: 18/117,369

(22) Filed: Mar. 3, 2023

(65) Prior Publication Data
US 2023/0223233 A1 Jul. 13, 2023

Related U.S. Application Data

(63) Continuation of application No. PCT/EP2021/072714, filed on Aug. 16, 2021.
(Continued)

(51) Int. Cl.
*H01J 37/12* (2006.01)
*H01J 37/28* (2006.01)
*H01J 37/317* (2006.01)

(52) U.S. Cl.
CPC .......... *H01J 37/3177* (2013.01); *H01J 37/12* (2013.01); *H01J 37/28* (2013.01)

(58) Field of Classification Search
CPC ......... H01J 37/12; H01J 37/28; H01J 37/3177
See application file for complete search history.

(56) References Cited

U.S. PATENT DOCUMENTS 9,665,014 B2 * 5/2017 Scheffers ................ G03F 7/707
2010/0248166 A1 9/2010 Nagae et al.
(Continued)

FOREIGN PATENT DOCUMENTS

| TW | I658487 B | 5/2019 |
| TW | I684197 B | 2/2020 |
| WO | WO 2018/122176 A1 | 7/2018 |

OTHER PUBLICATIONS

International Search Report issued in related Foreign Application No. PCT/EP2021/072714; mailed Feb. 1, 2022 (5 pgs.).

*Primary Examiner* — Sean M Luck
(74) *Attorney, Agent, or Firm* — FINNEGAN, HENDERSON, FARABOW, GARRETT & DUNNER LLP

(57) ABSTRACT

A charged particle system generates a charged particle multi beam along a multi beam path. The charged particle system comprises an aperture array, a beam limit array and a condenser lens. In the aperture array are an array of apertures to generate from an up-beam charged particle source charged particle paths down-beam of the aperture array. The beam-limit array is down-beam of the aperture array. Defined in the beam-limit array is an array of beam-limit apertures for shaping the charged particle multi beam path. The condenser lens system is between the aperture array and the beam-limit array. The condenser lens system selectively operates different of rotation settings that define different ranges of beam paths between the aperture array and the beam-limit array. At each rotation setting of the condenser lens system, each beam-limit aperture of the beam-limit array lies on a beam path down-beam of the aperture array.

20 Claims, 15 Drawing Sheets

Related U.S. Application Data

(60) Provisional application No. 63/074,344, filed on Sep. 3, 2020.

(56) References Cited

U.S. PATENT DOCUMENTS

| | | | |
|---|---|---|---|
| 2011/0139985 A1* | 6/2011 | Tanimoto | G01N 23/225 250/310 |
| 2012/0241606 A1* | 9/2012 | Han | H01J 37/04 250/307 |
| 2017/0025241 A1 | 1/2017 | Li et al. | |
| 2017/0025243 A1 | 1/2017 | Ren et al. | |
| 2020/0051779 A1 | 2/2020 | Ren et al. | |
| 2020/0152412 A1 | 5/2020 | Ren et al. | |
| 2020/0211811 A1 | 7/2020 | Ren et al. | |

* cited by examiner

CHARGED PARTICLE SYSTEM, APERTURE ARRAY, CHARGED PARTICLE TOOL AND METHOD OF OPERATING A CHARGED PARTICLE SYSTEM

CROSS-REFERENCE TO RELATED APPLICATIONS

This application claims priority of International application PCT/EP2021/072714, which was filed on 16 Aug. 2021 and claims priority of U.S. application 63/074,344, which was filed on 3 Sep. 2020, and of EP application 20200743.1, which was filed on 8 Oct. 2020. These applications are each incorporated herein by reference in their entireties.

FIELD

The embodiments of the present disclosure relate to a charged particle system, an aperture array, a charged particle tool and a method of operating a charged particle system.

BACKGROUND

When manufacturing semiconductor integrated circuit (IC) chips, undesired pattern defects, as a consequence of, for example, optical effects and incidental particles, inevitably occur on a substrate (i.e. wafer) or a mask during the fabrication processes, thereby reducing the yield. Monitoring the extent of the undesired pattern defects is therefore an important process in the manufacture of IC chips. More generally, the inspection and/or measurement of a surface of a substrate, or other object/material, is an import process during and/or after its manufacture.

Pattern inspection tools with a charged particle beam have been used to inspect objects, for example to detect pattern defects. These tools typically use electron microscopy techniques, such as a scanning electron microscope (SEM). In a SEM, a primary electron beam of electrons at a relatively high energy is targeted with a final deceleration step in order to land on a sample at a relatively low landing energy. The beam of electrons is focused as a probing spot on the sample. The interactions between the material structure at the probing spot and the landing electrons from the beam of electrons cause electrons to be emitted from the surface, such as secondary electrons, backscattered electrons or Auger electrons. The generated secondary electrons may be emitted from the material structure of the sample. By scanning the primary electron beam as the probing spot over the sample surface, secondary electrons can be emitted across the surface of the sample. By collecting these emitted secondary electrons from the sample surface, a pattern inspection tool may obtain an image representing characteristics of the material structure of the surface of the sample.

Another application for a charged particle beam is lithography. The charged particle beam reacts with a resist layer on the surface of a substrate. A desired pattern in the resist can be created by controlling the locations on the resist layer that the charged particle beam is directed towards.

A way of improving the performance of tools for such applications is to use a charged particle tool that generates a multi-beam of charged particles. By illuminating a sample with a multi-beam of charged particles, each of the sub-beams in the multi-beam effectively operate in parallel.

There is a general need to improve the performance and/or throughput of a charged particle tool that illuminates samples with a multi-beam of charged particles by developing techniques that allow a reduction of the pitch between sub-beams of the multi-beam, increase the density of the beams in the multi-beam incidental on a sample and/or increase the number of sub-beams that may be used.

SUMMARY

Embodiments of the present disclosure are directed to a manipulator for manipulating a charged particle beam, as well as a manipulator array comprising an array of manipulators. The manipulator or the manipulator array may be for use in a charged particle tool, such as a multi-beam charged particle tool. The charged particle tool may be a tool for generating, illuminating, projecting and/or detecting one or more beams of charged particles.

According to some embodiments of the present disclosure, there is provided a charged particle system for generating a charged particle multi beam along a charged particle multi beam path, the charged particle system comprising: an aperture array in which is defined an array of apertures configured to generate from an upbeam charged particle source charged particle paths downbeam of the aperture array; a beam-limit array arranged downbeam of the aperture array and in which is defined an array of beam-limit apertures for shaping the charged particle multi beam path, a condenser lens system arranged between the aperture array and the beam-limit array, wherein the condenser lens system is configured to selectively operate at one of a number of rotation settings, the number of rotation settings preferably being two or more, each rotation setting defining a different range of beam paths between the aperture array and the beam-limit array; wherein the apertures of the aperture array are configured so that, at each rotation setting of the condenser lens system, each beam-limit aperture of the beam-limit array lies on a charged particle beam path downbeam of the aperture array.

According to some embodiments of the present disclosure, there is provided an aperture array, the aperture array comprising a center and a pattern of apertures, wherein the pattern comprises a superposition of: a template pattern at a first rotation about the center and a first magnification, and the template pattern at a second rotation about the center and a second magnification.

According to some embodiments of the present disclosure, there is provided a charged particle tool comprising: the charged particle system of any preceding claim or a charged particle system comprising the aperture array of any preceding claim, wherein the charged particle system is configured to generate a charged particle multi-beam along the charged particle multi-beam path, and a charged particle projection system configured to direct the charged particle multi-beam along the charged particle multi-beam path onto a sample.

According to some embodiments of the present disclosure, there is provided a method of operating a charged particle system comprising an aperture array in which is defined an array of apertures, a beam-limit array arranged downbeam of the aperture array and in which is defined an array of beam-limit apertures, and a condenser lens system arranged between the aperture array and the beam-limit array, the method comprising: passing a charged particle beam through the apertures of the aperture array; operating the condenser lens system at two or more different rotation settings, each rotation setting defining a different beam path between the aperture array and the beam-limit array; and for each rotation setting, directing the charged particles from the aperture array through each of the beam-limit apertures of the beam-limit array.

Advantages of the various embodiments will become apparent from the following description taken in conjunction with the accompanying drawings wherein are set forth, by way of illustration and example, certain examples of the present disclosure.

BRIEF DESCRIPTION OF FIGURES

The above and other aspects of the present disclosure will become more apparent from the description of exemplary embodiments, taken in conjunction with the accompanying drawings, in which.

DETAILED DESCRIPTION

Figure 1:
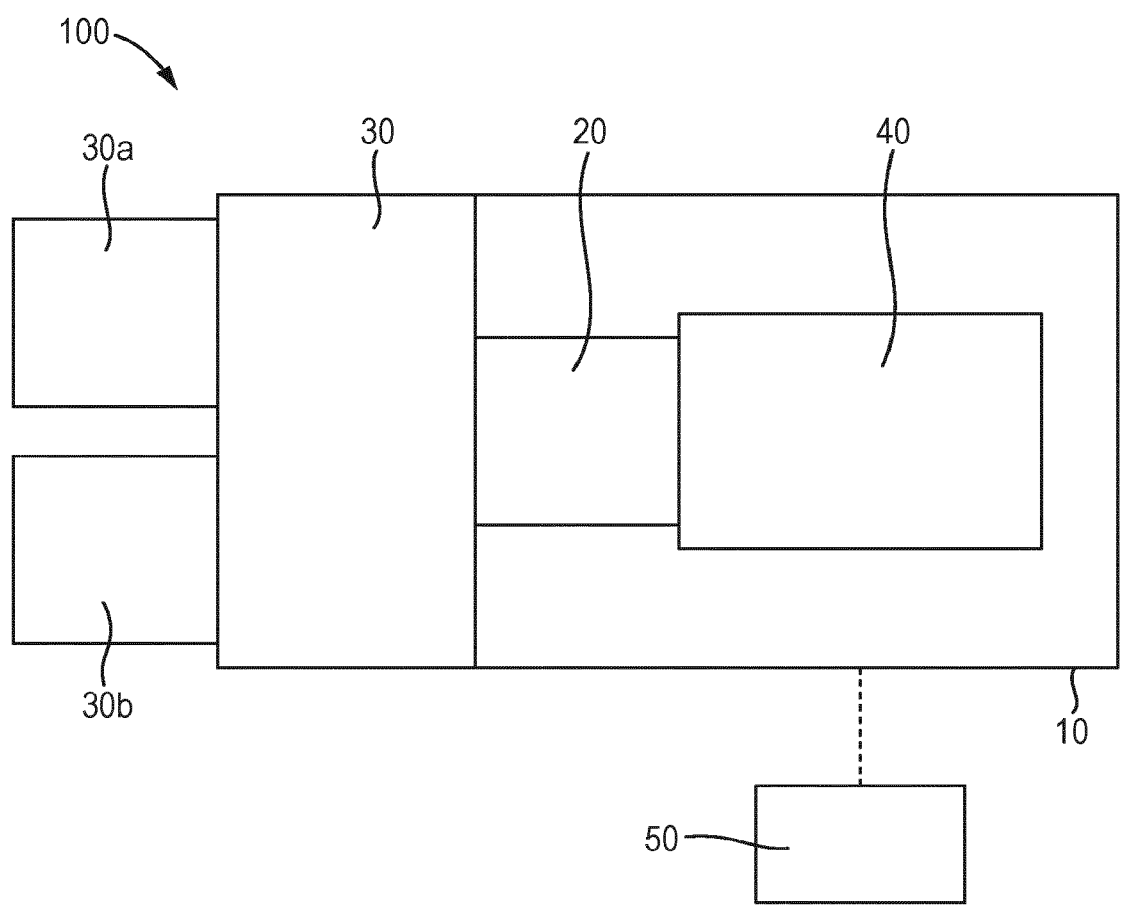
FIG. 1 schematically depicts a charged particle beam inspection apparatus.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations. Instead, they are merely examples of apparatuses and methods consistent with aspects related to the invention as recited in the appended claims.

The reduction of the physical size of devices, and enhancement of the computing power of electronic devices, may be accomplished by significantly increasing the packing density of circuit components such as transistors, capacitors, diodes, etc. on an IC chip. This has been enabled by increased resolution enabling yet smaller structures to be made. For example, an IC chip of a smart phone, which is the size of a thumbnail and available in, or earlier than, 2019, may include over 2 billion transistors, the size of each transistor being less than 1/1000th of a human hair. Thus, it is not surprising that semiconductor IC manufacturing is a complex and time-consuming process, with hundreds of individual steps. Errors in even one step have the potential to dramatically affect the functioning of the final product. Just one "killer defect" may cause device failure. The goal of the manufacturing process is to improve the overall yield of the process. For example, to obtain a 75% yield for a 50-step process (where a step may indicate the number of layers formed on a wafer), each individual step must have a yield greater than 99.4%. If an individual step has a yield of 95%, the overall process yield would be as low as 7-8%.

While high process yield is desirable in an IC chip manufacturing facility, maintaining a high substrate (i.e. wafer) throughput, defined as the number of substrates processed per hour, is also essential. High process yield and high substrate throughput may be impacted by the presence of a defect. This is especially if operator intervention is required for reviewing the defects. Thus, high throughput detection and identification of micro and nano-scale defects by inspection tools (such as a Scanning Electron Microscope (SEW)) is essential for maintaining high yield and low cost.

A SEM comprises a scanning device and a detector apparatus. The scanning device comprises an illumination system that comprises an electron source, for generating primary electrons, and a projection system for scanning a sample, such as a substrate, with one or more focused beams of primary electrons. The primary electrons interact with the sample and generate interaction products, such as secondary electrons and/or backscattered electrons. A detection system captures the secondary electrons and/or backscattered electrons from the sample as the sample is scanned so that the SEM may create an image of the scanned area of the sample. For high throughput inspection, some of the inspection apparatuses use multiple focused beams, i.e. a multi-beam, of primary electrons. The component beams of the multi-beam may be referred to as sub-beams or beamlets. A multi-beam may scan different parts of a sample simultaneously. A multi-beam inspection apparatus may therefore inspect a sample at a much higher speed than a single-beam inspection apparatus.

In a multi-beam inspection apparatus, the paths of some of the primary electron beams are displaced away from the central axis, i.e. a mid-point of the primary electron-optical axis (also referred to herein as the charged particle axis), of the scanning device. To ensure all the electron beams arrive at the sample surface with substantially the same angle of incidence, sub-beam paths with a greater radial distance from the central axis need to be manipulated to move through a greater angle than the sub-beam paths with paths closer to the central axis. This stronger manipulation may cause aberrations that cause the resulting image to be blurry and out-of-focus. An example is spherical aberrations which bring the focus of each sub-beam path into a different focal plane. In particular, for sub-beam paths that are not on the central axis, the change in focal plane in the sub-beams is greater with the radial displacement from the central axis. Such aberrations and de-focus effects may remain associated with the secondary electrons from the target when they are detected, for example the shape and size of the spot formed by the sub-beam on the target will be affected. Such aberrations therefore degrade the quality of resulting images that are created during inspection.

An implementation of a known multi-beam inspection apparatus is described below.

The figures are schematic. Relative dimensions of components in drawings are therefore exaggerated for clarity. Within the following description of drawings the same or like reference numbers refer to the same or like components or entities, and only the differences with respect to the individual embodiments are described. While the description and drawings are directed to an electron-optical apparatus, it is appreciated that the embodiments are not used to limit the present disclosure to specific charged particles. References to electrons throughout the present document may therefore be more generally be considered to be references to charged particles, with the charged particles not necessarily being electrons.

Reference is now made to FIG. 1, which is a schematic diagram illustrating an exemplary charged particle beam inspection apparatus 100. The charged particle beam inspection apparatus 100 of FIG. 1 includes a main chamber 10, a load lock chamber 20, a charged particle tool 40, an equipment front end module (EFEM) 30 and a controller 50. Charged particle tool 40 is located within main chamber 10. Charged particle tool 40 may be an electron beam tool 40. Charged particle tool 40 may be a single-beam tool or a multi-beam tool.

EFEM 30 includes a first loading port 30a and a second loading port 30b. EFEM 30 may include additional loading port(s). First loading port 30a and second loading port 30b may, for example, receive substrate front opening unified pods (FOUPs) that contain substrates (e.g., semiconductor substrates or substrates made of other material(s)) or samples to be inspected (substrates, wafers and samples are collectively referred to as "samples" hereafter). One or more robot arms (not shown) in EFEM 30 transport the samples to load lock chamber 20.

Load lock chamber 20 is used to remove the gas around a sample. This creates a vacuum that is a local gas pressure lower than the pressure in the surrounding environment. The load lock chamber 20 may be connected to a load lock vacuum pump system (not shown), which removes gas particles in the load lock chamber 20. The operation of the load lock vacuum pump system enables the load lock chamber to reach a first pressure below the atmospheric pressure. After reaching the first pressure, one or more robot arms (not shown) transport the sample from load lock chamber 20 to main chamber 10. Main chamber 10 is connected to a main chamber vacuum pump system (not shown). The main chamber vacuum pump system removes gas molecules in main chamber 10 so that the pressure around the sample reaches a second pressure lower than the first pressure. After reaching the second pressure, the sample is transported to the electron beam tool by which it may be subject to measurement which may include charged particle flooding and/or inspection. A charged particle tool 40 may comprise either a single beam or a multi-beam electron-optical apparatus.

Controller 50 is electronically connected to charged particle beam tool 40. Controller 50 may be a processor (such as a computer) configured to control the charged particle beam inspection apparatus 100. Controller 50 may also include a processing circuitry configured to execute various signal and image processing functions. While controller 50 is shown in FIG. 1 as being outside of the structure that includes main chamber 10, load lock chamber 20, and EFEM 30, it is appreciated that controller 50 may be part of the tool or at least its structure. The controller 50 may be located in one of the component elements of the charged particle beam inspection apparatus 100 or it may be distributed over at least two of the component elements. While the present disclosure provides examples of main chamber 10 housing a charged particle tool, it should be noted that aspects of the disclosure in their broadest sense are not limited to a chamber housing a charged particle tool. Rather, it is appreciated that the foregoing principles may also be applied to other tools and other arrangements of apparatus, that operate under the second pressure.

Figure 2:
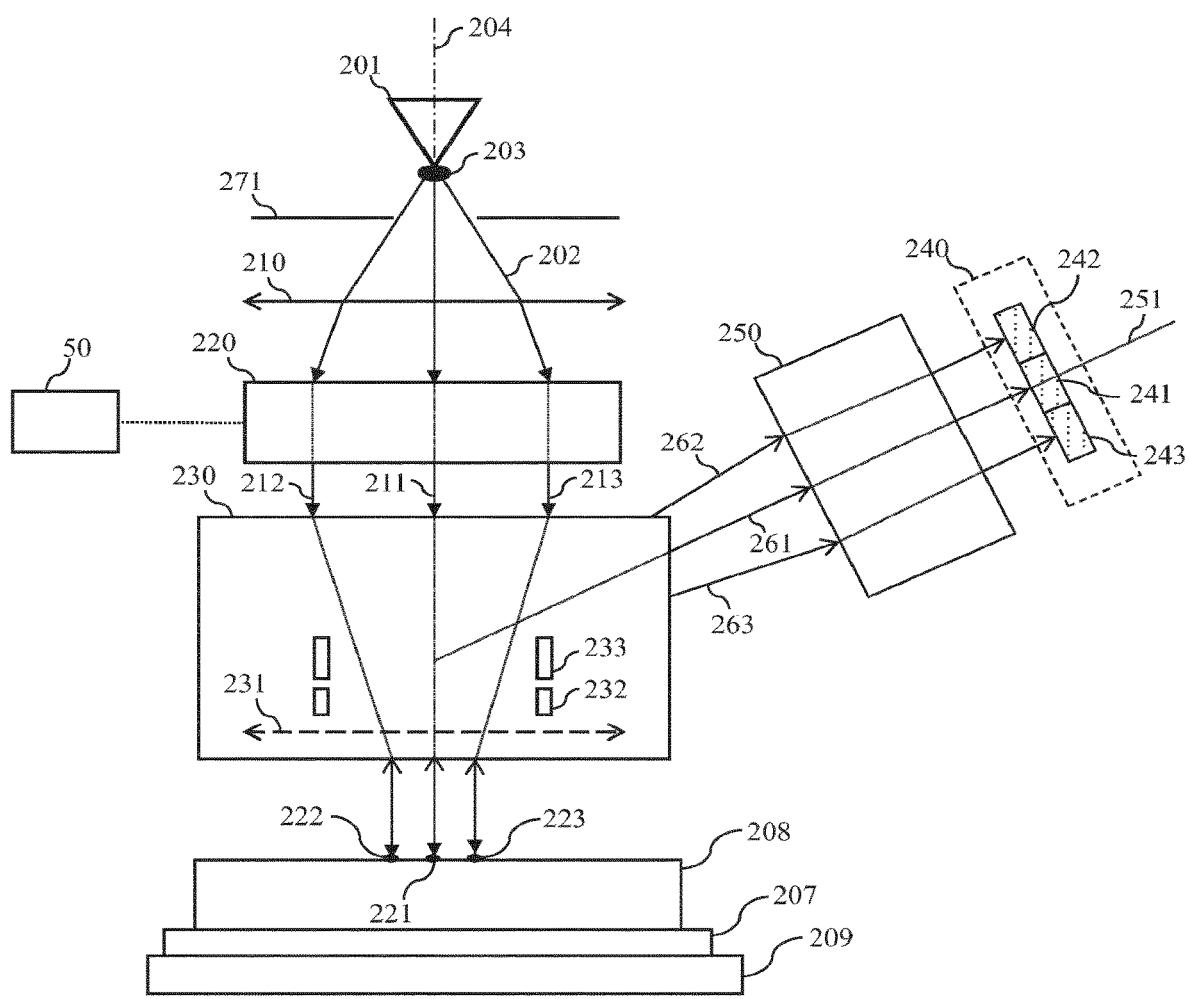
FIG. 2 schematically depicts a charged particle tool, which may form part of the charged particle beam inspection apparatus of FIG. 1.

Reference is now made to FIG. 2, which is a schematic diagram illustrating an exemplary charged particle tool 40. The charged particle tool 40 may form part of the charged particle beam inspection apparatus 100 of FIG. 1. The charged particle tool 40 may comprise a charged particle inspection tool 200. As shown in FIG. 1, the charged particle inspection tool 200 may be a multi-beam inspection tool 200. Alternatively, the charged particle inspection tool 200 may be a single-beam inspection tool. The charged particle inspection tool 200 comprises an electron source 201, a gun aperture plate 271, a condenser lens 210, optionally a source conversion unit 220, a primary projection system 230, a motorized stage 209, and a sample holder 207. The electron source 201, the gun aperture plate 271, the condenser lens 210, and optionally the source conversion unit 220 are the components of an illumination system comprised by the charged particle inspection tool 200. The sample holder 207 is supported by motorized stage 209 so as to hold and optionally to position a sample 208 (e.g., a substrate or a mask), for example for measurement, inspection or for charged particle flooding Primary projection system 230 may comprise an objective lens 231 and optionally the source conversion unit 220 (if it is not part of the illumination system). Together the primary projection system and the illumination system may be referred to as a primary column or primary electron-optical system. A beam separator 233 and a deflection scanning unit 232 may be positioned inside primary projection system 230. The charged particle inspection tool 200 may further comprise a secondary projection system 250 and an associated electron detection device 240 (which together may form a detection column or detection system). Electron detection device 240 may comprise a plurality of detection elements 241, 242, and 243. The beam separator directs generated electrons from the sample to the secondary column for detection. Other detector arrangements might exist for example in the primary column for example associated with the objective lens 231 or the source conversation unit 220.

The components that are used to generate a primary beam may be aligned with a primary electron-optical axis of the charged particle inspection tool 200. These components may include: the electron source 201, gun aperture plate 271, condenser lens 210, source conversion unit 220, beam separator 233, deflection scanning unit 232, and primary projection apparatus 230. Secondary projection system 250 and its associated electron detection device 240 may be aligned with a secondary electron-optical axis 251 of the charged particle inspection tool 200.

The primary electron-optical axis 204 is comprised by the electron-optical axis of the part of the charged particle inspection tool 200 that is the illumination system. The secondary electron-optical axis 251 is the electron-optical axis of the part of the charged particle inspection tool 200 that is a detection system (or detection column). The primary electron-optical axis 204 may also be referred to herein as the primary optical axis (to aid ease of reference) or charged particle optical axis. The secondary electron-optical axis 251 may also be referred to herein as the secondary optical axis or the secondary charged particle optical axis.

Electron source 201 may comprise a cathode (not shown) and an extractor or anode (not shown). During operation, electron source 201 is configured to emit electrons as primary electrons from the cathode. The primary electrons are extracted or accelerated by the extractor and/or the anode to form a primary electron beam 202 that forms a primary beam crossover (virtual or real) 203. Primary electron beam 202 may be visualized as being emitted from primary beam crossover 203.

The formed primary electron beam 202 may be a single beam and a multi-beam may be generated from the single beam. At different locations along the beam path, the primary electron beam 202 may therefore be either a single beam or a multi-beam. By the time it reaches the sample, and preferably before it reaches the projection system, the primary electron beam 202 may be a multi-beam. Such a multi-beam may be generated from the primary electron beam in a number of different ways. For example, the multi-beam may be generated by a multi-beam array located before the crossover 203, a multi-beam array located in the source conversion unit 220, or a multi-beam array located at any point in between these locations. A multi-beam array may comprise a plurality of electron beam manipulating elements arranged in an array across the beam path. Each manipulating element may influence at least part of the primary electron beam to generate a sub-beam. Thus, the multi-beam array interacts with an incident primary beam path to generate a multi-beam path down-beam of the multi-beam array. The interaction of the multi-beam array with the primary beam may include one or more aperture arrays, individual deflectors e.g. per sub-beam, lenses, stigmators and (aberration) correctors, again e.g. per sub-beam.

Gun aperture plate 271, in operation, is configured to block off peripheral electrons of primary electron beam 202 to reduce Coulomb effect. The Coulomb effect may enlarge the size of each of probe spots 221, 222, and 223 of primary sub-beams 211, 212, 213, and therefore deteriorate inspection resolution. A gun aperture plate 271 may also include multiple openings for generating primary sub-beams (not shown) even before the source conversion unit 220 and may be referred to as a coulomb aperture array.

Condenser lens 210 is configured to focus (or collimate) primary electron beam 202. For example, the condenser lens 210 may be designed to focus (or collimate) primary electron beam 202 to become a substantially parallel beam and be substantially normally incident onto source conversion unit 220. Condenser lens 210 may be a movable condenser lens that may be configured so that the position of its principal plane is movable. In some embodiments, the movable condenser lens may be configured to physically move, e.g. along the optical axis 204. Alternatively, the movable condenser lens may be constituted of two or more electro-optical elements (lenses) in which the principal plane of the condenser lens moves with a variation of the strength of the individual electro-optical elements. The (movable) condenser lens may be configured to be magnetic, electrostatic or a combination of magnetic and electrostatic lenses. In some embodiments, the condenser lens 210 may be an anti-rotation condenser lens. The anti-rotation condenser lens may be configured to keep the rotation angles unchanged when the focusing power (collimating power) of the condenser lens 210 is changed and/or when the principal plane of the condenser lens moves.

In an example of the source conversion unit 220, the source conversion unit 220 may comprise an image-forming element array, an aberration compensator array, a beam-limit array, and a pre-bending micro-deflector array. The pre-bending micro-deflector array may, for example, be optional and may be present in an example in which the condenser lens does not ensure substantially normal incidence of the paths of a plurality of primary sub-beams 211, 212, 213 of primary electron beam 202 originating from the coulomb aperture array onto e.g. the beam-limit array, the image-forming element array, and/or the aberration compensator array. In this arrangement, the image-forming element array may function as a multi-beam array to generate the plurality of sub-beams in the multi-beam path, i.e. primary sub-beams 211, 212, 213. The image forming element array may, for example, comprise a plurality electron beam manipulators such as micro-deflectors or micro-lenses (or a combination of both) to influence the plurality of primary sub-beams 211, 212, 213 of primary electron beam 202 and to form a plurality of parallel images (virtual or real) of primary beam crossover 203, one for each of the primary sub-beams 211, 212, and 213. The aberration compensator array may, for example, comprise a field curvature compensator array (not shown) and an astigmatism compensator array (not shown). The field curvature compensator array may, for example, comprise a plurality of micro-lenses to compensate field curvature aberrations of the primary sub-beams 211, 212, and 213. The astigmatism compensator array may comprise a plurality of micro-stigmators, or multi-pole electrodes, to compensate astigmatism aberrations of the primary sub-beams 211, 212, and 213. The beam-limit array may be configured to limit or define diameters of individual primary sub-beams 211, 212, and 213. FIG. 2 shows three primary sub-beams 211, 212, and 213 as an example, and it should be understood that source conversion unit 220 may be configured to form any number of primary sub-beams. Controller 50 may be connected to various parts of charged particle beam inspection apparatus 100 of FIG. 1, such as source conversion unit 220, electron detection device 240, primary projection system 230, or motorized stage 209. As explained in further detail below, controller 50 may perform various image and signal processing functions. Controller 50 may also generate various control signals to govern operations of the charged particle beam inspection apparatus, including the charged particle multi-beam apparatus.

Condenser lens 210 may further be configured to adjust electric currents of primary sub-beams 211, 212, 213 down-beam of source conversion unit 220 by varying the focusing power (collimating power) of condenser lens 210. Alternatively, or additionally, the electric currents of the primary sub-beams 211, 212, 213 may be changed by altering the radial sizes of beam-limit apertures within the beam-limit array corresponding to the individual primary sub-beams. If the condenser lens is moveable and magnetic, off-axis sub-beams 212 and 213 may result that illuminate source conversion unit 220 with rotation angles. The rotation angles change with the focusing power or the position of the first principal plane of the movable condenser lens. A condenser lens 210 that is an anti-rotation condenser lens may be configured to keep the rotation angles unchanged while the focusing power of condenser lens 210 is changed. Such a condenser lens 210 that is also movable, may cause the rotation angles not change when the focusing power of the condenser lens 210 and the position of its first principal plane are varied.

Objective lens 231 may be configured to focus sub-beams 211, 212, and 213 onto the sample 208 for inspection and may form three probe spots 221, 222, and 223 on the surface of sample 208.

Beam separator 233 may be, for example, a Wien filter comprising an electrostatic deflector generating an electrostatic dipole field and a magnetic dipole field (not shown in FIG. 2). In operation, beam separator 233 may be configured to exert an electrostatic force by electrostatic dipole field on individual electrons of primary sub-beams 211, 212, and 213. In some embodiments, the electrostatic force is equal in magnitude but opposite in direction to the magnetic force exerted by magnetic dipole field of beam separator 233 on the individual primary electrons of the primary sub-beams 211, 212, and 213. Primary sub-beams 211, 212, and 213 may therefore pass at least substantially straight through beam separator 233 with at least substantially zero deflection angles. The direction of the magnetic force depends on the direction of motion of the electrons while the direction of the electrostatic force does not depend on the direction of motion of the electrons. So because the secondary electrons and backscattered electrons generally move in an opposite direction compared to the primary electrons, the magnetic force exerted on the secondary electrons and backscattered electrons will no longer cancel the electrostatic force and as a result the secondary electrons and backscattered electrons moving through the beam separator 233 will be deflected away from the optical axis 204.

Deflection scanning unit 232, in operation, is configured to deflect the paths of primary sub-beams 211, 212, and 213 to scan probe spots 221, 222, and 223 across individual scanning areas in a section of the surface of sample 208. In response to incidence of primary sub-beams 211, 212, and 213 or probe spots 221, 222, and 223 on sample 208, electrons are generated from the sample 208 which include secondary electrons and backscattered electrons. The secondary electrons propagate in three secondary electron beams 261, 262, and 263. The secondary electron beams 261, 262, and 263 typically have secondary electrons (having electron energy ≤50 eV) and may also have at least some of the backscattered electrons (having electron energy between 50 eV and the landing energy of primary sub-beams 211, 212, and 213). The beam separator 233 is arranged to deflect the paths of the secondary electron beams 261, 262, and 263 towards the secondary projection system 250. The secondary projection system 250 subsequently focuses the path of secondary electron beams 261, 262, and 263 onto a plurality of detection regions 241, 242, and 243 of electron detection device 240. The detection regions may, for example, be the separate detection elements 241, 242, and 243 that are arranged to detect corresponding secondary electron beams 261, 262, and 263. The detection regions may generate corresponding signals which are, for example, sent to controller 50 or a signal processing system (not shown), e.g. to construct images of the corresponding scanned areas of sample 208.

The detection elements 241, 242, and 243 may detect the corresponding secondary electron beams 261, 262, and 263. On incidence of secondary electron beams with the detection elements 241, 242 and 243, the elements may generate corresponding intensity signal outputs (not shown). The outputs may be directed to an image processing system (e.g., controller 50). Each detection element 241, 242, and 243 may comprise one or more pixels. The intensity signal output of a detection element may be a sum of signals generated by all the pixels within the detection element.

The controller 50 may comprise image processing system that includes an image acquirer (not shown) and a storage device (not shown). For example, the controller may comprise a processor, computer, server, mainframe host, terminals, personal computer, any kind of mobile computing devices, and the like, or a combination thereof. The image acquirer may comprise at least part of the processing function of the controller. Thus the image acquirer may comprise at least one or more processors. The image acquirer may be communicatively coupled to an electron detection device 240 of the apparatus 40 permitting signal communication, such as an electrical conductor, optical fiber cable, portable storage media, IR, Bluetooth, internet, wireless network, wireless radio, among others, or a combination thereof. The image acquirer may receive a signal from electron detection device 240, may process the data comprised in the signal and may construct an image therefrom. The image acquirer may thus acquire images of sample 208. The image acquirer may also perform various post-processing functions, such as generating contours, superimposing indicators on an acquired image, and the like. The image acquirer may be configured to perform adjustments of brightness and contrast, etc. of acquired images. The storage may be a storage medium such as a hard disk, flash drive, cloud storage, random access memory (RAM), other types of computer readable memory, and the like. The storage may be coupled to the image acquirer and may be used for saving scanned raw image data as original images, and post-processed images.

The image acquirer may acquire one or more images of a sample based on an imaging signal received from the electron detection device 240. An imaging signal may correspond to a scanning operation for conducting charged particle imaging. An acquired image may be a single image comprising a plurality of imaging areas. The single image may be stored in the storage. The single image may be an original image that may be divided into a plurality of regions. Each of the regions may comprise one imaging area containing a feature of sample 208. The acquired images may comprise multiple images of a single imaging area of sample 208 sampled multiple times over a time period. The multiple images may be stored in the storage. The controller 50 may be configured to perform image processing steps with the multiple images of the same location of sample 208.

The controller 50 may include measurement circuitry (e.g., analog-to-digital converters) to obtain a distribution of the detected secondary electrons. The electron distribution data, collected during a detection time window, may be used in combination with corresponding scan path data of each of primary sub-beams 211, 212, and 213 incident on the sample surface, to reconstruct images of the sample structures under inspection. The reconstructed images may be used to reveal various features of the internal or external structures of sample 208. The reconstructed images may thereby be used to reveal any defects that may exist in the sample.

The controller 50 may, e.g. further control the motorized stage 209 to move the sample 208 during, before or after inspection of the sample 208. In some embodiments, the controller 50 may enable the motorized stage 209 to move sample 208 in a direction, e.g. continuously, for example at a constant speed, at least during sample inspection. The controller 50 may control movement of the motorized stage 209 so that it the speed of the movement of the sample 208 changes, e.g. dependent on various parameters. For example, the controller may control the stage speed (including its direction) depending on the characteristics of the inspection steps of scanning process.

Although FIG. 2 shows that the charged particle inspection tool 200 uses three primary electron sub-beams, it is appreciated that the charged particle inspection tool 200 may use two or a greater number of primary electron sub-beams, for example 9, 49, 121, more than 1000, 10,000 and as much as 100,000. The present disclosure does not limit the number of primary electron beams used in the charged particle inspection tool 200. The charged particle inspection tool 200 may also be a single-beam inspection tool 200, which uses a single charged particle beam.

Figure 3:
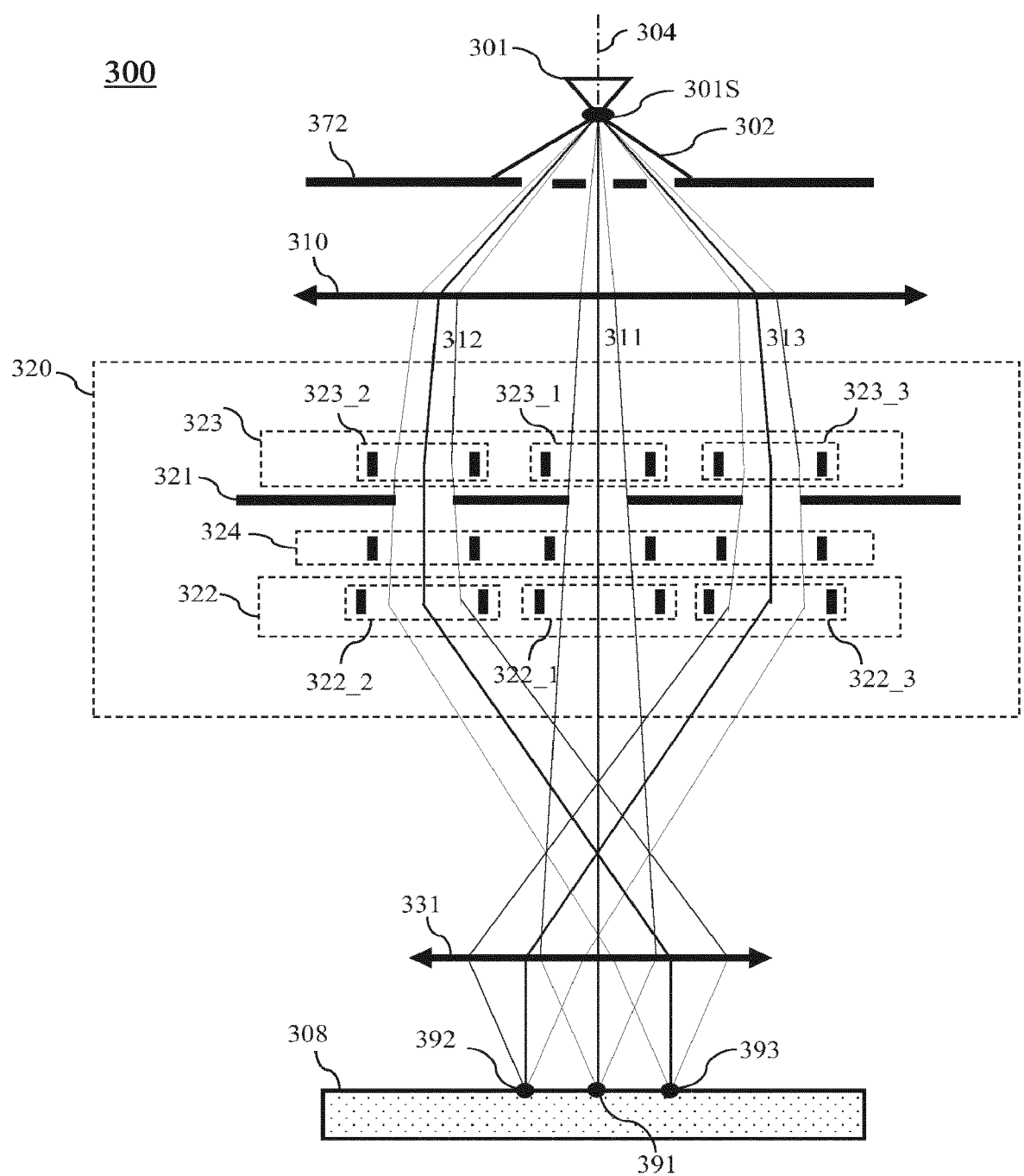
FIG. 3 schematically depicts a multi-beam tool illustrating an exemplary configuration of the source conversion unit.

Reference is now made to FIG. 3, which is a schematic diagram of exemplary multi-beam tool 300 illustrating an exemplary configuration of the source conversion unit 220 of the exemplary charged particle beam inspection tool 200 of FIG. 1. The multi-beam tool 300 may comprise an electron source 301, a pre-sub-beam-forming aperture array 372 (further also referred to as coulomb aperture array 372), a condenser lens 310 (similar to condenser lens 210 of FIG. 2), a source conversion unit 320 (similar to source conversion unit 220 of FIG. 2), an objective lens 331 (similar to objective lens 231 of FIG. 2), and a sample 308 (similar to sample 208 of FIG. 2). The electron source 301, the coulomb aperture array 372, and the condenser lens 310 may be the components of an illumination apparatus comprised by the tool 300. The source conversion unit 320 and the objective lens 331 may be the components of a projection apparatus comprised by the tool 300. The source conversion unit 320 may be similar to source conversion unit 220 of FIG. 2 in which the image-forming element array of FIG. 2 is image-forming element array 322, the aberration compensator array of FIG. 2 is aberration compensator array 324, the beam-limit array of FIG. 2 is beam-limit array 321, and the pre-bending micro-deflector array of FIG. 2 is pre-bending micro-deflector array 323. The electron source 301, the coulomb aperture array 372, the condenser lens 310, the source conversion unit 320, and the objective lens 331 are aligned with a primary electron-optical axis 304 of the apparatus. The electron source 301 generates a primary-electron beam 302 generally along the primary electron-optical axis 304 and with a source crossover (virtual or real) 301S. The coulomb aperture array 372 cuts the peripheral electrons of primary electron beam 302 to reduce a consequential Coulomb effect. The Coulomb effect is a source of aberration to the sub-beams due to interaction between electrons in different sub-beam paths. The primary-electron beam 302 may be trimmed into a specified number of sub-beams, such as three sub-beams 311, 312 and 313, by the coulomb aperture array 372 of a pre-sub-beam-forming mechanism. Although three sub-beams and their paths are referred to in the previous and following description, it should be understood that the description is intended to apply an apparatus, tool, or system with any number of sub-beams.

The source conversion unit 320 may include a beamlet-limit aperture array 321 with beam-limit apertures configured to define the outer dimensions of the sub-beams 311, 312, and 313 of the primary electron beam 302. The source conversion unit 320 may also include an image-forming element array 322 with image-forming micro-deflectors, 322_1, 322_2, and 322_3. There is a respective micro-deflector associated with the path of each sub-beam. The micro-deflectors 322_1, 322_2, and 322_3 are configured to deflect the paths of the sub-beams 311, 312, and 313 towards the electron-optical axis 304. The deflected sub-beams 311, 312 and 313 form virtual images (not shown) of source crossover 301S. The virtual images are projected onto the sample 308 by the objective lens 331 and form probe spots thereon, which are the three probe spots, 391, 392, and 393. Each probe spot corresponds to the location of incidence of a sub-beam path on the sample surface. The source conversion unit 320 may further comprise an aberration compensator array 324 configured to compensate aberrations that may be present in each of the sub-beams. The aberrations in each sub-beam may be present on the probe spots, 391, 392, and 393 that would be formed a sample surface. The aberration compensator array 324 may, for example, include a field curvature compensator array (not shown) with micro-lenses, i.e. the aberration compensator array 324 may comprise a micro-lens array. The field curvature compensator and micro-lenses may, for example, be configured to compensate the individual sub-beams for field curvature aberrations evident in the probe spots, 391, 392, and 393. The aberration compensator array 324 may include an astigmatism compensator array (not shown) with micro-stigmators, i.e. the aberration compensator array 324 may comprise a micro-stigmator array. The micro-stigmators may, for example, be controlled to operate on the sub-beams to compensate astigmatism aberrations that are otherwise present in the probe spots, 391, 392, and 393.

The source conversion unit 320 may further comprise a pre-bending micro-deflector array 323 with pre-bending micro-deflectors 323_1, 323_2, and 323_3 to bend the sub-beams 311, 312, and 313 respectively. The pre-bending micro-deflectors 323_1, 323_2, and 323_3 may bend the path of the sub-beams onto the beamlet-limit aperture array 321. In some embodiments, the pre-bending micro-deflector array 323 may be configured to bend the sub-beam path of sub-beams towards the orthogonal of the plane of beamlet-limit aperture array 321.

In some embodiments, the condenser lens 310 may adjust the path direction of the sub-beams onto the beamlet-limit aperture array 321. The condenser lens 310 may, for example, focus (collimate) the three sub-beams 311, 312, and 313 to become substantially parallel beams along primary electron-optical axis 304, so that the three sub-beams 311, 312, and 313 are incident substantially perpendicularly onto source conversion unit 320, which may correspond to the beamlet-limit aperture array 321. In such embodiments, the pre-bending micro-deflector array 323 may not be necessary.

The image-forming element array 322, the aberration compensator array 324, and the pre-bending micro-deflector array 323 may comprise multiple layers of sub-beam manipulating devices, some of which may be in the form or arrays, for example: micro-deflectors, micro-lenses, or micro-stigmators.

In the current example of the source conversion unit 320, the paths of the sub-beams 311, 312 and 313 of the primary electron beam 302 are respectively deflected by the micro-deflectors 322_1, 322_2 and 322_3 of image-forming element array 322 towards the primary electron-optical axis 304. It should be understood that the sub-beam 311 path may already correspond to the electron-optical axis 304 prior to reaching micro-deflector 322_1, accordingly the sub-beam 311 path may not be deflected by micro-deflector 322_1.

The objective lens 331 focuses the sub-beams onto the surface of the sample 308, i.e., it projects the three virtual images onto the sample surface. The three images formed by three sub-beams 311 to 313 on the sample surface form three probe spots 391, 392 and 393 thereon. In some embodiments, the deflection angles of sub-beams 311 to 313 are adjusted to pass through or approach the front focal point of objective lens 331 to reduce or limit the off-axis aberrations of three probe spots 391 to 393.

In the example of a charged particle inspection tool 300 as shown in FIG. 3 the beam path of the secondary electrons, beam separator (similar as Wien filter 233), secondary projection optics (similar as secondary projection optics 250 of FIG. 2) and electron detection device (similar as electron detection device 240) have been omitted for clarity reasons. Is should be clear however that similar beam separator, secondary projection optics and electron detection device may be present in the current example of FIG. 3 to register and generate an image of the sample surface using the secondary electrons or backscattered electrons.

At least some of the above-described components in FIG. 2 and FIG. 3 may individually, or in combination with each other, be referred to as a manipulator array, or manipulator, because they manipulate the paths of one or more beams, or sub-beams, of charged particles.

The above described multi-beam tool comprises a single source of charged particles. The multi-beam tool comprises an illumination apparatus and a projection apparatus. The illumination apparatus may generate a multi-beam of charged particles from the beam of electrons from the source. The projection apparatus projects a multi-beam of charged particles towards a sample. At least part of the surface of a sample may be scanned with the multi-beam of charged particles.

A multi-beam tool comprises one or more electron-optical devices for manipulating the sub-beams of the multi-beam of charged particles. The applied manipulation may be, for example, a deflection of the paths of sub-beams and/or a focusing operation applied to the sub-beams. The one or more electron-optical devices may comprise MEMS.

The charged particle tool may comprise beam path manipulators located up-beam of the electron-optical device and, optionally, in the electron-optical device. Beam paths may be manipulated linearly in directions orthogonal to the charged particle axis, i.e. optical axis, by, for example, two electrostatic deflector sets operating across the whole beam. The two electrostatic deflector sets may be configured to deflect the beam path in orthogonal directions. Each electrostatic deflector set may comprise two electrostatic deflectors located sequentially along the beam path. The first electrostatic deflector of each set applies a correcting deflection, and the second electrostatic deflector restores the beam to the correct angle of incidence on the electron-optical device. The correcting deflection applied by the first electrostatic deflector may be an over correction so that the second electrostatic deflector can apply a deflection for ensuring the desired angle of incidence to the MEMS. The location of the electrostatic deflector sets could be at a number of locations up-beam of the electron-optical device. Beam paths may be manipulated rotationally. Rotational corrections may be applied by a magnetic lens. Rotational corrections may additionally, or alternatively, be achieved by an existing magnetic lens such as the condenser lens arrangement.

Although not shown, embodiments of the charged particle tool also include a charged particle projection apparatus that divides a charged particle beam from a source into a plurality of sub-beams. A plurality of respective objective lenses may project the sub-beams onto a sample. In some embodiments, a plurality of condenser lenses is provided up-beam from the objective lenses. The condenser lenses focus each of the sub-beams to an intermediate focus up-beam of the objective lenses. In some embodiments, collimators are provided up-beam from the objective lenses. Correctors may be provided to reduce focus error and/or aberrations. In some embodiments, such correctors are integrated into or positioned directly adjacent to the objective lenses. Where condenser lenses are provided, such correctors may additionally, or alternatively, be integrated into, or positioned directly adjacent to, the condenser lenses and/or positioned in, or directly adjacent to, the intermediate foci. A detector is provided to detect charged particles emitted by the sample. The detector may be integrated into the objective lens. The detector may be on the bottom surface of the objective lens so as to face a sample in use. The condenser lenses, objective lenses and/or detector may be formed as MEMS or CMOS devices.

Figure 4:
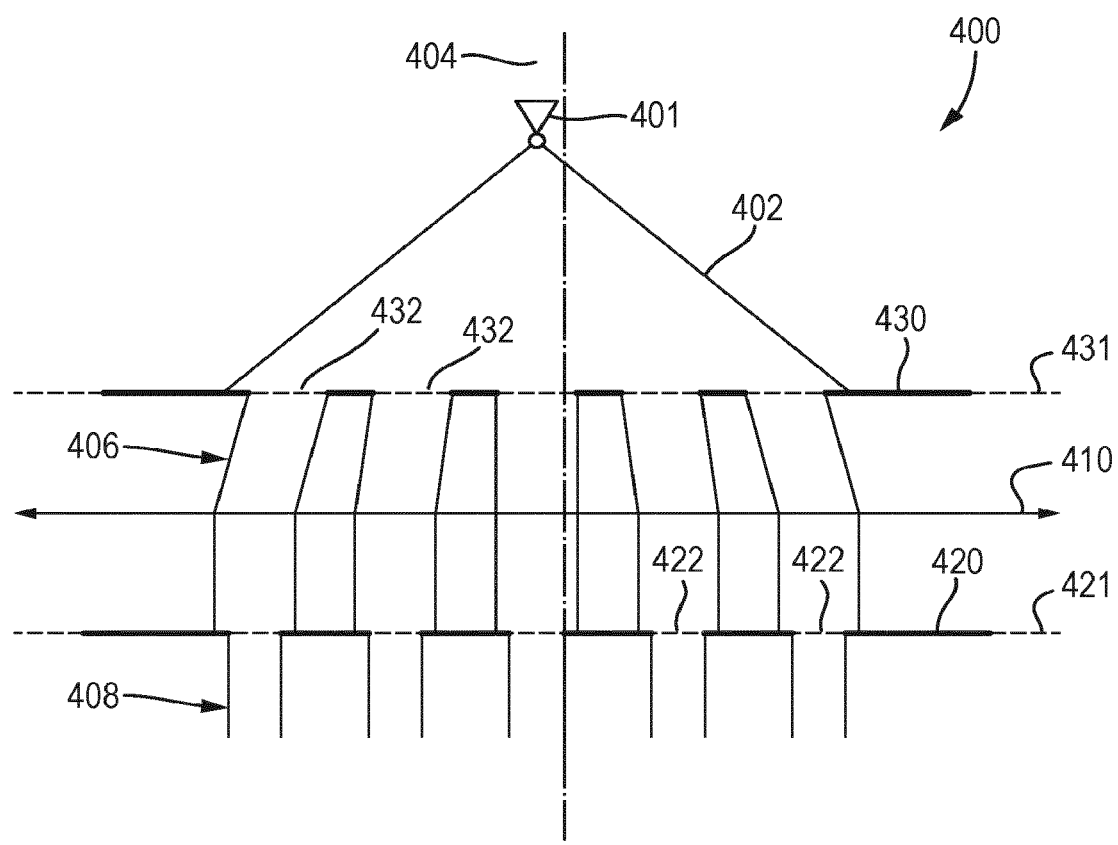
FIG. 4 schematically depicts a charged particle system according to some embodiments of the present disclosure.

FIG. 4 schematically depicts an example of a charged particle system 400, which may be referred to as a beam generator or illumination system. The charged particle system 400 is for generating a charged particle multi-beam along a charged particle multi-beam path 408. The charged particle system 400 may, for example, be part of the charged particle inspection tool 200, 300 of FIG. 2 or 3.

The charged particle system 400 comprises a condenser lens system 410, a beam-limit array 420 and an aperture array 430. The charged particle system 400 may further comprise a charged particle source 401. The aperture array 430 is herein also referred to as a coulomb aperture array 430 and may correspond to the gun aperture plate 271 (also referred to as coulomb aperture array 271) of FIG. 2 or the pre-sub-beam-forming aperture array 372 (also referred to as coulomb aperture array 372) of FIG. 3. The condenser lens system 430 may correspond to the condenser lens 210 of FIG. 2 or the condenser lens 310 of FIG. 3. The beam-limit aperture 420 may correspond to the beam-limit array of the source conversion unit 220 of FIG. 2 or to the beam-limit array 321 of FIG. 3. The charged particle source 401 may, for example, correspond to the electron source 201 of FIG. 2 or the electron source 301 of FIG. 3.

The aperture array 430 is arranged in plane 431. The beam-limit array 420 is arranged in plane 421. The beam-limit array 420 is arranged downbeam of the aperture array 430, and downbeam of the condenser lens system 410. The condenser lens system 410 is arranged between the aperture array 430 and the beam-limit array 420. That is, the condenser lens system 410 is arranged downbeam of the aperture array 430 and upbeam of the beam-limit array 420. The aperture array 430, the condenser lens system 410, the beam-limit aperture 420, and optionally the charged particle source 401 may be aligned with an axis 404. The axis 404 may also be referred to as a primary electro-optical axis 404. The axis 404 may be aligned with the primary electron-optical axis 204 of FIG. 2 or the primary electron-optical axis 304 of FIG. 3. A center of the aperture array 430 (for example a central aperture of the aperture array 430) may be aligned with the axis 404. Furthermore, a center of the beam-limit array 420 (for example a central aperture of the beam-limit array 420) may be aligned with the axis 404. The planes 421, 431 in which the beam-limit array 420 and the aperture array 430 may be arranged, may be orthogonal to the axis 404.

The charged particle source 401 may generate a charged particle beam 402. The charged particle beam 402 may propagate in a direction along the axis 404. The aperture array 430 may pass portions of the charged particle beam 402, so as to generate charged particle beam paths 406 downbeam of the aperture array 430. The beams following the charged particle beam paths 406 may be referred to as beamlets or sub-beams in reference to the charged particle beam 402. Downbeam of the aperture array 430, the charged particle beam 402 may propagate along the charged particle beam paths 406. The aperture array 430 may block off peripheral charged particles from the charged particle beam 402 so as to reduce the Coulomb effect (i.e. reduce interactions between charged particles). The aperture array 430 may generate charged particle beam paths 406 for propagating a plurality of pre-formed beamlets. The condenser lens system 410 may manipulate (or adjust) the charged particle beam paths 406 (and thereby the charged particle beam 402) between the aperture array 430 and the beam-limit array 420. The beam-limit array 420 may shape the charged particle beam paths 406 to form the charged particle multi-beam path 408. A beamlet propagating on a changed particle multi-beam path 408 is formed by passing at least a portion of the charged particle beam 402 on the charged particle beam paths 406 through an aperture of beam-limit array 420. The charged particle beam 402 may propagate to form beamlets along the charged particle multi-beam path 408 which correspond to the beamlets 211, 212, 213 of FIG. 2 or the beamlets 311, 312, 313 of FIG. 3.

The condenser lens system 410 may comprise at least one magnetic lens, for example two or more magnetic lenses. The magnetic lens simultaneously controls or manipulates the magnification (or amount of focus) and the amount of rotation of the charged particle beam paths 406, i.e. of the charged particle beam 402 propagating along the charged particle beam paths 406. So, the condenser lens system 410 may operate at different magnification settings and rotation settings. Magnification as used herein includes magnification by a factor of less than 1, i.e. de-magnification. Manipulating the magnification (or amount of focus) of the charged particle beam path 406 affects the cross-sectional area (and thus the charge density) of the charged particle beam paths 406 in the plane 421 of the beam-limit array 420. This affects the number of charged particles that pass through the beam-limit array 420 per unit time, i.e. the rate of passage of charge particles and thus current. The charge density of the charged particle beam 402 at a moment in time along the charged particle multi-beam path 408 (or of the beamlets along the charged particle multi-beam path 408) may thus be controlled by adjusting the magnification setting of the condenser lens system 410. Adjusting the magnification setting of the condenser lens system 410 may adjust the magnification of the charged particle beam paths 406. The condenser lens system 410 may be operated to control the charge density of the charged particle multi-beam over time. When used in the charged particle inspection tool 200, 300 of FIG. 2 or 3, the condenser lens system 410 may thus be used to control the probe current. The probe current is the current at the probe spots 221, 222, 223 of FIG. 2 or at the probe spots 391, 392, 393 of FIG. 3. Due to the interaction of charged particles with the magnetic field generated by the magnetic lens, the charged particle beam will rotate at the same time as being focused/defocused (i.e. at the same time as adjusting magnification) by the condenser lens system 410. This is explained below with reference to FIG. 5a.

Figure 5A:
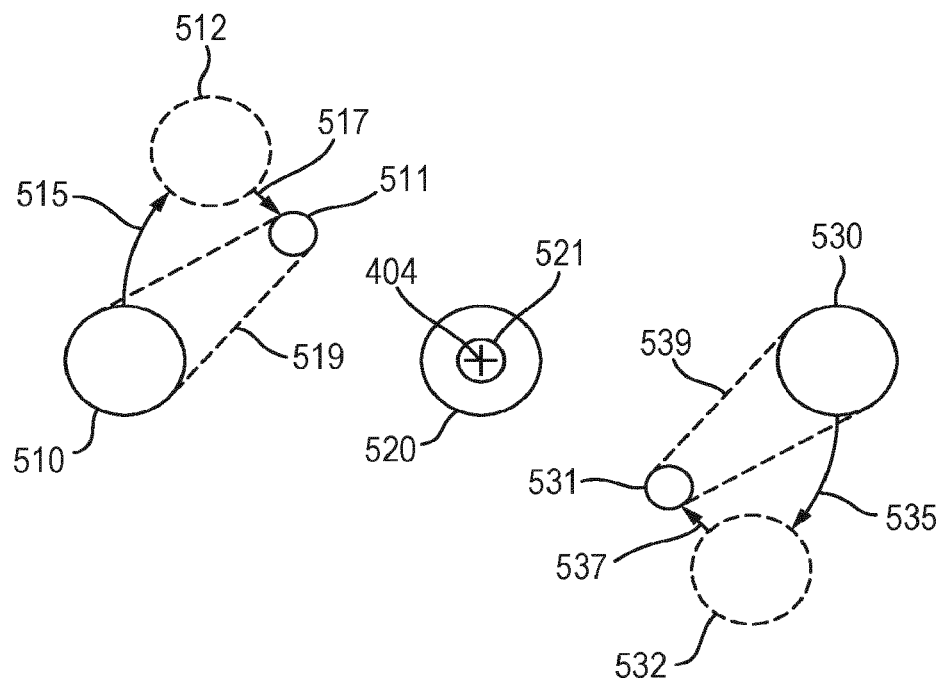
FIGS. 5a and 5b schematically illustrate the effect of a condenser lens system on a charged particle beam.

FIG. 5a shows exemplary cross-sections 510, 520, 530 of charged particle beam paths 406 in plane 431 of the aperture array 430, i.e. before manipulation by the condenser lens system 410. FIG. 5a further shows the cross-sections 511, 521, 531 of the same charged particle beam paths 406 in plane 421 of the beam-limit array 420, i.e. after manipulation by the condenser lens system 410. As shown in FIG. 5a, the off-center charged particle beam paths (corresponding to cross-sections 510, 511 and 530, 531) are rotated (as shown by arrows 515, 535) about axis 404. In addition, the focus of the charged particle beam paths 406 about the axis 404 may be adjusted, e.g. de-magnified, (as shown by arrows 517, 537). In general terms, adjusting the focus of the charged particle beam paths 406 includes converging the charged particle beam paths 406 towards a focal point on the axis 404, collimating the charged particle beam paths 406, or diverging the charged particle beam paths 406 from a focal point on the axis 404. The dashed lines 512, 532 in FIG. 5a are included solely for illustration purposes, to show separately the rotation and the focus of the charged particle beam paths 406. In practice, the charged particle beam paths 406 may simultaneously be rotated and focused. For example, the dashed lines 519, 539 schematically depict one example of simultaneous rotation and focus of the charged particle beam paths 406 between the aperture array 430 and the beam-limit array 420. The central cross-section 520, 521 will also be rotated about the axis 404, even though this is not illustrated for the circular cross-section depicted in FIG. 5a. Rotation of the central cross-section 520, 521 would be apparent in FIG. 5a for cross-sections that are not circularly symmetric about the axis 404.

A type of conventional condenser lens system 410 may include at least two magnetic lenses, in particular an upbeam magnetic lens and a downbeam magnetic lens, as described in International Application PCT/EP2020/063829, which is hereby incorporated by reference so far as the description of controlling the rotation (or anti-rotation) setting of the constituent condenser lenses and the referenced aperture array arrangements. The upbeam magnetic lens and the downbeam magnetic lens may be controlled independently from each other. The upbeam magnetic lens and the downbeam magnetic lens may be operated so as to avoid rotation of the charged particle beam paths 406 between the plane 431 of the aperture array 430 and the plane 421 of the beam-limit array 420. At the same time, the condenser lens system 410 may enable adjustment of the magnification (or amount of focus) of the charged particle beam paths 406. So, the condenser lens system 410 is conventionally operated at a single, fixed anti-rotation setting and different magnification settings. This may be achieved by reversing, using the downbeam magnetic lens, any rotation of the charged particle beam 406 due to the upbeam magnetic lens. The upbeam magnetic lens and the downbeam magnetic lens may be operated so as to avoid any net rotation of the charged particle beam paths 406 between the aperture array 430 and the beam-limit array 420. That is an anti-rotation setting of the condenser lens arrangement and applies net zero rotation to the particle beam paths 406.

Figure 5B:
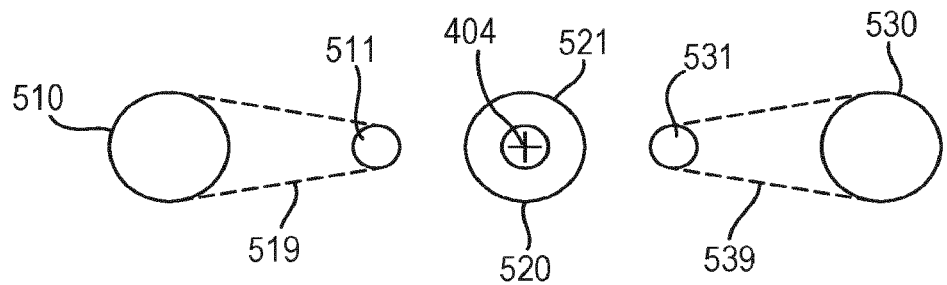

FIG. 5b shows exemplary cross-sections 510, 520, 530 of charged particle beam paths 406 in plane 431 of the aperture array 430. FIG. 5b further shows exemplary cross-sections 511, 521, 531 of the same charged particle beam paths 406 in plane 421 of the beam-limit array 420, after manipulation by the condenser lens system 410 operating in the anti-rotation setting. The charged particle beam paths 406 are kept along a radial path relative to the axis 404. That is the charged particle beam paths 406 are not rotated about axis 404. The magnification of the charged particle beam paths 406 is adjusted, such that the cross-sections 511, 521, 531 in the plane 421 are smaller than the cross-sections 510, 520, 530 in the plane 431. The off-center cross-sections 511, 531 in the plane 421 are closer to the axis 404 than the cross-sections 510, 530 in the plane 431. The focus of the charged particle beam paths 406 is thus adjusted. The magnification of the charged particle beam paths 406 is adjusted. Operating the condenser lens system 410 in an anti-rotation setting thus means that there is no rotation of the charged particle beam paths 406 when comparing the cross-sections of the charged particle beam paths 406 in the plane 431 of the aperture array 430 and in the plane 421 of the beam-limit array 420. There may, however, be rotation at any intermediary plane between the plane 431 of the aperture array 430 and the plane 421 of the beam-limit array 420.

The condenser lens system 410 may thus conventionally be operated to adjust the magnification (or amount of focus) of the charged particle beam paths 406 without rotating the charged particle beam paths 406. Under a type of conventional operation of the condenser lens system 410, the apertures 432 of the aperture array 430 are kept to a radial path relative to the axis 404 (i.e. not rotated) with respect to the apertures of the beam-limit array 420. In plan view along axis 404, each aperture 432 of the aperture array 430 and respective corresponding aperture 422 of the beam-limit array 420 are arranged in the same angular direction about axis 404. The apertures 422 of the aperture array 430 and the apertures 432 of the beam-limit array 420 differ only in their radial position and/or extent. This is explained with reference to FIGS. 6 and 7 below.

Figure 6:
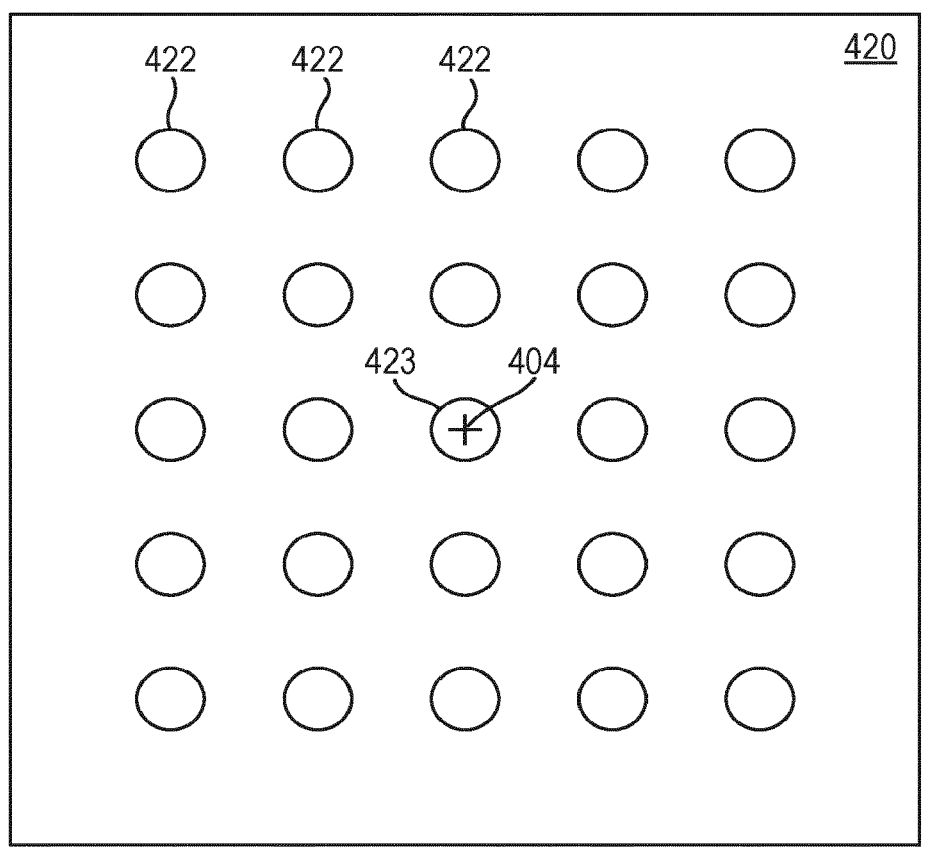
FIG. 6 schematically depicts, in plan view, an example of a beam-limit aperture.

FIG. 6 schematically shows an example of a beam-limit array 420. In the beam-limit array 420 is defined an array of beam-limit apertures 422. The beam-limit apertures are for shaping the path of the charged particle multi-beam 408 downbeam of the beam-limit array 420. The beam-limit apertures 422 may thus, for example, be arranged in any desired pattern for a beam arrangement of the multi-beam, i.e. in which the beamlets of the charged particle multi-beam 408 are to be arranged. For example, the beam-limit array 420 may be a regular array. The beam-limit array 420 may be a rectangular, square or hexagonal array. The beam-limit apertures 422 may, however, also be arranged in an irregular pattern.

The beam-limit apertures 422 may be uniform in shape, size, cross-section, or pitch, or any combinations thereof. As used herein, the pitch of an array with circular apertures may be referred to as the distance between the centers of two immediately adjacent apertures. For example, beam-limit apertures 422 may have a circular cross-section, as shown in FIG. 6. However, beam-limit apertures could also have a square, triangular, or elliptical cross section, or a cross section of any other shape. Beam-limit apertures 422 may also be non-uniform in shape, size, cross-section, or pitch, or any combinations thereof.

FIG. 6 shows a square array of 25 beam-limit apertures 422. However, the beam-limit array 420 may comprise any other number of apertures 422. For example, the beam-limit array 420 may comprise 4, 9, 16, 25, 36, 49, 64, 81, 100 or more apertures 422. In some embodiments, the beam-limit array 420 may comprise more than 1000 or even more than 10000 beam-limit apertures 422.

Figure 7:
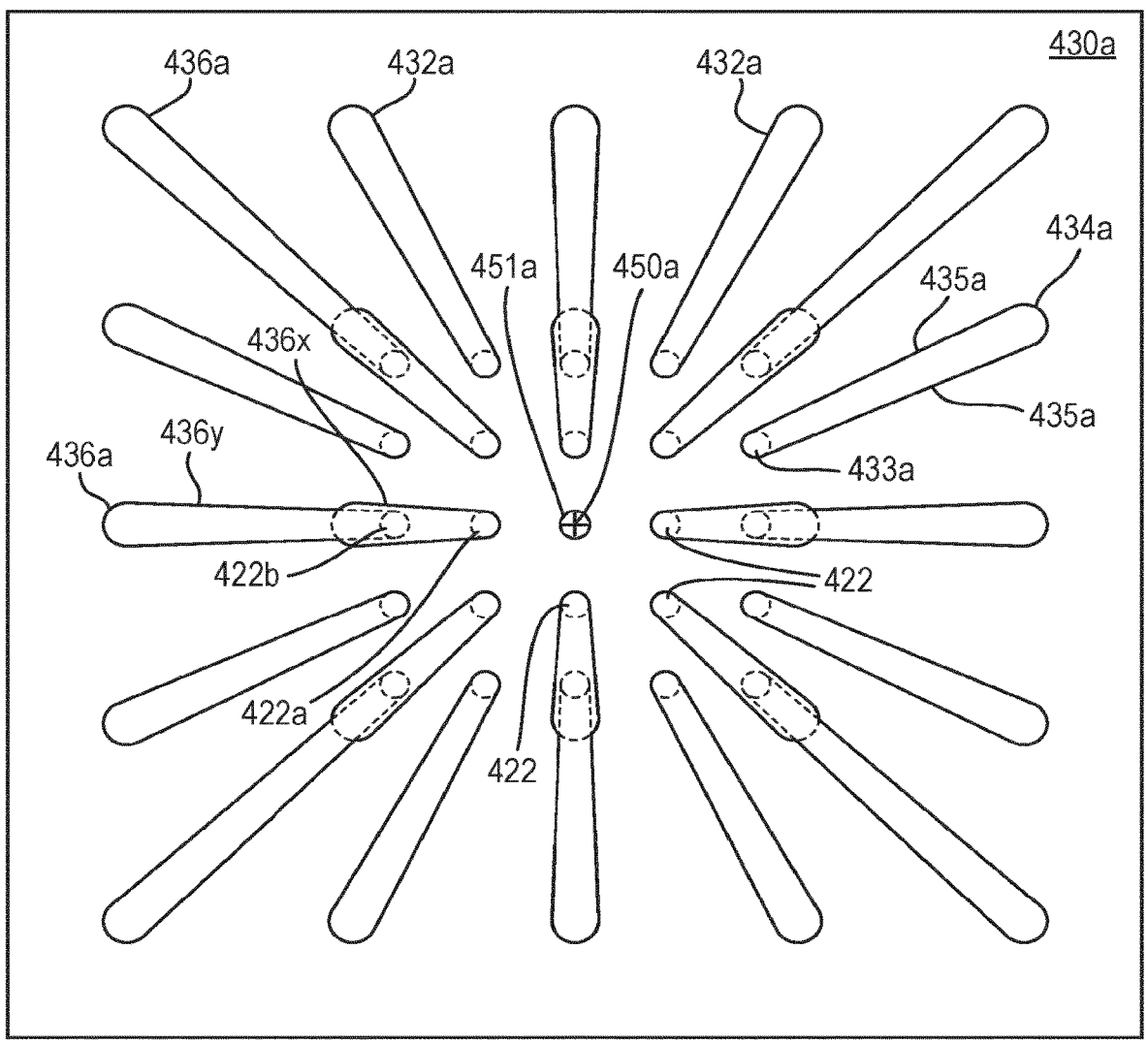
FIG. 7 schematically depicts, in plan view, an example of an aperture array for use with a condenser lens system operating at a zero-rotation setting.

FIG. 7 schematically shows an example of an aperture array 430a for use with the anti-rotation setting of the condenser lens system 410 and with the beam-limit array 420 of FIG. 6. In the aperture array 430a is defined an array of apertures 432a. The array of apertures 432a may generate, from the upbeam charged particle source 401, charged particle beam paths 406 downbeam of the aperture array 430a.

The aperture array 430a comprises a center 450a. The center 450a may be aligned with the axis 404. The aperture array 430a may comprise a central aperture 451a. The central aperture 451a may have the same shape as a corresponding central aperture 423 of the beam-limit array 420. The central aperture 451a may or may not have the same dimensions as the central aperture 423 of the beam-limit array 420. The off-center apertures 432a of the aperture array 430a may extend radially away from the center 404 of the aperture array 430a. The pattern of the apertures 432 may be rotationally symmetric about the center 450a.

FIG. 7 shows, for purely illustrative purposes, in dotted lines the outlines of the apertures 422 of the beam-limit array 420 when overlaid onto the aperture array 430a. The pattern formed by the dotted lines (and in this example corresponding to the pattern of the beam-limit array 420) will herein also be referred to as a template pattern. This is because the template pattern (e.g. the pattern of beam-limit array 420) may form the basis, i.e. template, of the pattern of the aperture array 430a. Thus the pattern of the aperture array 430a (e.g. pattern array) may be determined based on the template pattern. By appropriately modifying the template pattern and superposing the modified template patterns, the aperture array 430a may be created.

Generally, the template pattern may be modified so as to simulate different condenser lens settings. That is, the template pattern may be modified by changing the rotation and/or magnification of the template pattern. In general terms, the template pattern may be any pattern of an array of apertures. Preferably, the template pattern is a square or hexagonal pattern. Further preferably, the template pattern is a regular pattern. The template pattern may comprise a pattern of an array of circular apertures. Alternatively, the template pattern may comprise any pattern of an aperture array, regular or irregular, with apertures of any shape. The template pattern preferably corresponds to the pattern of the beam-limit array 420.

The pattern of the aperture array 430a corresponds to a superposition of different magnifications of the template pattern. The template pattern may be modified by changing the magnification, and the modified template patterns may be superposed to form the pattern of the aperture array 430a. In particular, the pattern of the aperture array 430a corresponds to a superposition (or overlaying) of the template pattern over a continual range of magnifications. The patterns of the aperture array 430a may be created by varying the magnification of the template pattern within a range of magnifications so as to create a plurality of modified template patterns, and superposing (or overlaying) the modified template patterns. For example, the pattern of the aperture array 430a may correspond to a superposition of i) the template pattern at a first (smallest) magnification, ii) the template pattern at a second (largest) magnification, and iii) the template patterns at any magnification between the first and second magnifications. The first magnification and the second magnifications are different magnifications. In superimposing the modified template patterns the centers of the template patterns may be aligned.

For example, as shown in FIG. 7, an off-center aperture 432a may comprise an edge having a radially inner portion 433a and a radially outer portion 434a. The off-center aperture 432a may further comprise straight portions 435a that interconnect the radially inner portion 433a and the radially outer portion 434a. The terms "radially inner" and "radially outer" are here used with respect to the center 450a of the aperture array 430a. The radially inner portion 433a may correspond in shape to a radially inner portion of an edge of a corresponding beam-limit aperture 422 in the beam-limit array 420. The radially outer portion 434 may correspond in shape to a radially outer portion of an edge of the corresponding beam-limit aperture 422. In an alternative arrangement (in which the condenser lens has a discrete settings in the magnitude range), the aperture array 430*a* has discrete apertures corresponding to the apertures 422 of the beam-limit array 420. In such an arrangement, the radially inner portion 433*a* may correspond to the edge of a complete aperture which may be circular. The radially outer portion 434 may be the entire edge of an aperture which may be circular.

The aperture array 430*a* shown in FIG. 7 has two types of aperture 432*a*, 436*a*. Some of these apertures 432*a* show have a pattern that generates a charged particle beam path 406 that corresponds to a single aperture 422 in the beam-limit array. Others of these apertures 433*a* form a charged particle beam path 406 that corresponds to two or more apertures 422 in the beam-limit array 420. In the aperture pattern 430*a* shown, the aperture 436*a* is derived from the overlap of template patterns of two different apertures of the beam limit aperture array 420*a* over the magnitude range. The different apertures of the beam-limit array 420 are a radially inner beam-limit aperture 422*a* and a radially outer beam-limit aperture 422*b*. This may be the case when the radially inner and radially outer beam-limit apertures 422*a, b* are positioned along the same angular direction about the center of the beam-limit aperture 422. As a non-rotation setting is used with a continuous magnitude range, there is a high chance of overlap. Consequently, superposition of the template pattern for the corresponding apertures in the beam-limit array 420 derives two apertures 433*x*, 433*y* (partly shown in dashed lines) in the aperture array that overlap. Thus the aperture array 430*a* has just one aperture 433*a* (comprising the above-described radially inner portion 433*a*, radially outer portion 434*a* and straight portions 435*a*.

The radially outer portion 434*a* of the apertures 432*a* sets a maximum magnification setting at which the condenser lens system 410 may be operated so as to direct the charged particle beam paths 406 from the aperture array 430*a* to cover the apertures 422 of the beam-limit array 420. At magnifications settings higher than this maximum magnification setting, a charged particle beam propagating along the charged particle beam paths 206 may partially cover the apertures 422 of the beam-limit array 420. So, at least part of the apertures 422 of the beam-limit array 420 may be unexposed to or not illuminated by the charged particle beam. Similarly, the radially inner portion 433*a* of the apertures 432*a* may set a minimum magnification setting at which the condenser lens system 410 may be operated so as to direct the charged particle beam paths 406 from the aperture array 430*a* to cover the apertures 422 of the beam-limit array 420. The magnification settings in the range between the maximum and the minimum magnification settings allow the condenser lens system 410 to be operated so as to direct the charged particle beam paths 406 from the aperture array 430*a* to cover the apertures 422 of the beam-limit array 420. The aperture array 430*a* is thus compatible with a condenser lens system 410 that operates within a range of magnifications settings. It is noted that the magnification settings of the condenser lens system 410 may correspond to the inverse of the magnifications of the modified template patterns (when corresponding to the beam-limit array 422) used to form the aperture array 430*a*.

However this example of aperture array is limited to a single, fixed zero-rotation setting. Note in an arrangement, the same pattern could be used at a fixed rotation setting. In that arrangement, the beam-limit array and the aperture array should be rotated relative to each by the rotational displacement of the fixed rotations setting relative to zero rotation. Note: later reference to zero-rotation setting, for the purposes of this disclosure, includes a fixed rotation setting in which there is a fixed rotational displacement in the charged particle beam paths 406 between the aperture array 430 and the beam-limit array 420.

Figure 14:
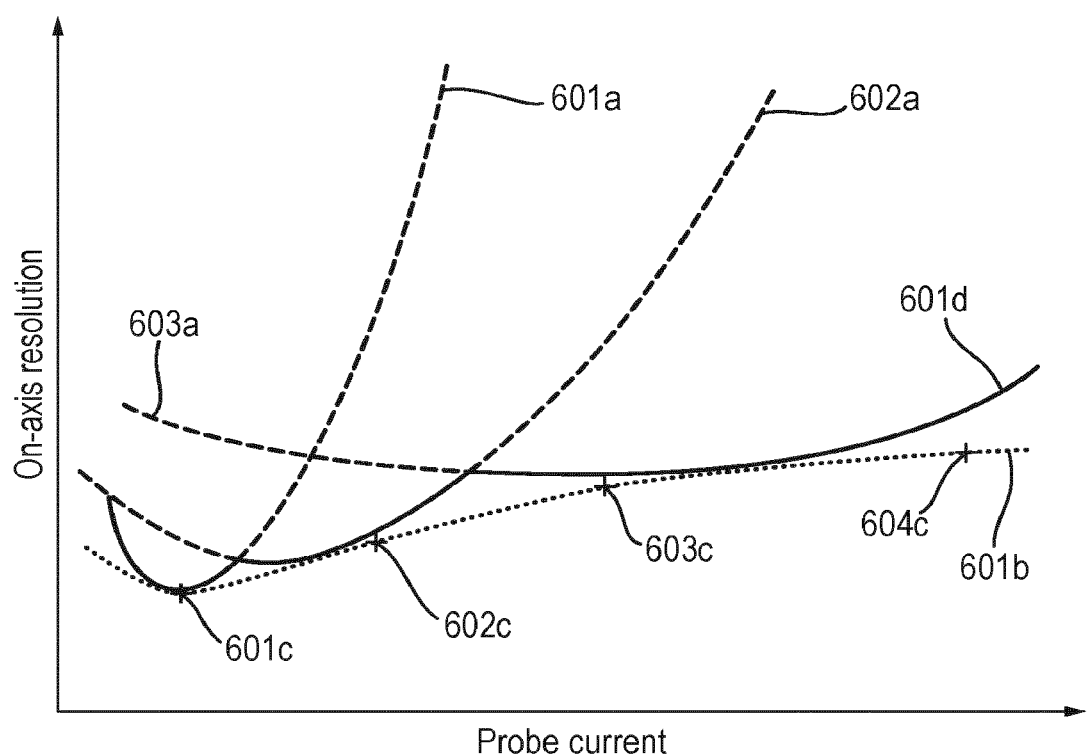
FIG. 14 schematically depicts a graph showing the dependence of probe resolution on probe current for a variety of different modes of operating a condenser lens system.

The operation of the condenser lens system at a fixed zero-rotation setting, in combination with the aperture array 430*a* of FIG. 7 and the beam-limit array 420 of FIG. 6, allows the probe current to be adjusted by controlling the magnification setting of the condenser lens system 410. However, the inventors have found that, when such a configuration is used in the charged particle inspection tool 200, 300 of FIG. 2 or 3, the resolution of the probe spots 221, 222, 223 of FIG. 2 or of the probe spots 391, 392, 393 of FIG. 3 may worsen with varying magnification (and so with varying probe current). This is schematically shown in FIG. 14, showing the dependence of on-axis resolution (e.g. in nm) on probe current (e.g. in nA). Curves 601*a*, 602*a*, 603*a* respectively show the resolution/probe current dependence for a single fixed rotation setting of the condenser lens system 410. For example, curve 601*a* may correspond to a fixed rotation of −45 degrees, curve 602*a* may correspond to a fixed rotation of 0 degrees, and curve 603*a* may correspond to a fixed rotation of +45 degrees. As shown, the resolution worsens for relatively large or small probe currents (so relatively small or large magnifications) compared to an optimal resolution. The optimal resolution for each probe current is represented by the dotted curve 601*b* in FIG. 14. Relatively small or large magnifications may thus result in significantly worse resolution of the probe spots. A probe beam of increased magnification would be expected to enable probing of smaller structures; however increasing magnification of probing beam has been found to increase the minimum feature size that may be probed.

Based on this observation, the inventors have found that for a magnification setting of the condenser lens system 410 (and so for a corresponding probe current), there exists a corresponding rotation that may be used to achieve optimal resolution of the probe spot. This optimal resolution is schematically shown by curve 601*b* on FIG. 14. By appropriately controlling both the rotation and magnification settings using the condenser lens system 410, the optimal resolution curve 601*b* of FIG. 14 can be followed. As such, to optimize or at least improve the resolution of the probe spot, it is desirable to control the condenser lens system 410 to operate at multiple rotation settings (instead of a single, zero-rotation setting). At each rotation setting, it is desirable to control the condenser lens system 410 to operate at a respective magnification setting.

In particular, the magnification M of the charged particle beam propagating along charged particle beam paths 406 using the condenser lens system 410 may be described by the mathematical equation:

$$M \approx \frac{d_0}{d_{caa}} + \frac{L}{d_{caa}} - \frac{d_o L \varepsilon^2}{a d_{caa}} = \alpha - \beta \varepsilon^2; \quad \text{Equation 1}$$

where $d_0$, $d_{caa}$, L and a are constants corresponding to the geometrical dimensions of the charged particle system 400. $d_0$ is the distance from the virtual source to the principal plane of the condenser lens system 410. $d_{caa}$ is the distance between the virtual source and the plane 431 of the aperture array 430. L is the distance between the principal plane of the condenser lens system 410 and the beam-limit array 420. a is a constant that approximates the relation between the focal distance f of the condenser lens system 410 and the excitation of the condenser lens system ε by the relation f≈a/ε². ε is a variable. ε corresponds to a measure of the excitation of the condenser lens system 410. α and β are constants that depend on the configuration of the charged particle system 400. The rotation θ of the charged particle beam propagating along the charged particle beam paths 406 using the condenser lens system 410 may be described by the mathematical equation:

$$\theta = \sqrt{\frac{e}{8m_e U}} \int_{z_0}^{z_1} B dz = \kappa \varepsilon: \qquad \text{Equation 2}$$

e is the charge of a charged particle in the charged particle beam. $m_e$ is the mass of a charged particle. U is the energy of the charged particle beam 402 propagating along the charged particle beam paths 406. The magnetic field created by the condenser lens system 410 is has an effect between coordinates $z_0$ and $z_1$ along the axis 404. B is the magnetic flux density of the magnetic field created by the condenser lens system 410, K is thus a constant that depends on the configuration of the charged particle system 400.

These insights allow an aperture array 430 to be designed based on an existing beam-limit array 420, wherein the aperture array 430 allows for operation of the condenser lens system 410 so as to achieve optimal (or substantially optimal) resolution preferably over a greater extent of the magnification setting range. Substantially optimal resolution may herein be understood to mean any resolution that is within 20%, preferably within 10%, further preferably within 5% of the theoretical optimal value for the resolution achievable by controlling only the condenser lens system 410 (i.e. not adjusting any other components of the charged particle system 400). The aperture array 430 may be designed to allow for simultaneous rotation θ and magnification M (in accordance with the equations above) of the charged particle beam propagating along the charged particle beam paths 406. The simultaneous rotation θ and magnification M may be achieved for a range of E, i.e. for a range of different excitation values of the condenser lens system 410. The aperture array 430 is to be designed such that each beam-limit aperture 422 of the beam-limit array 420 lies on the charged particle beam paths 406. This means that beam-limit apertures 422 are fully exposed or illuminated by charged particle beamlets propagating along the charged particle beam paths 406.

Figure 8:
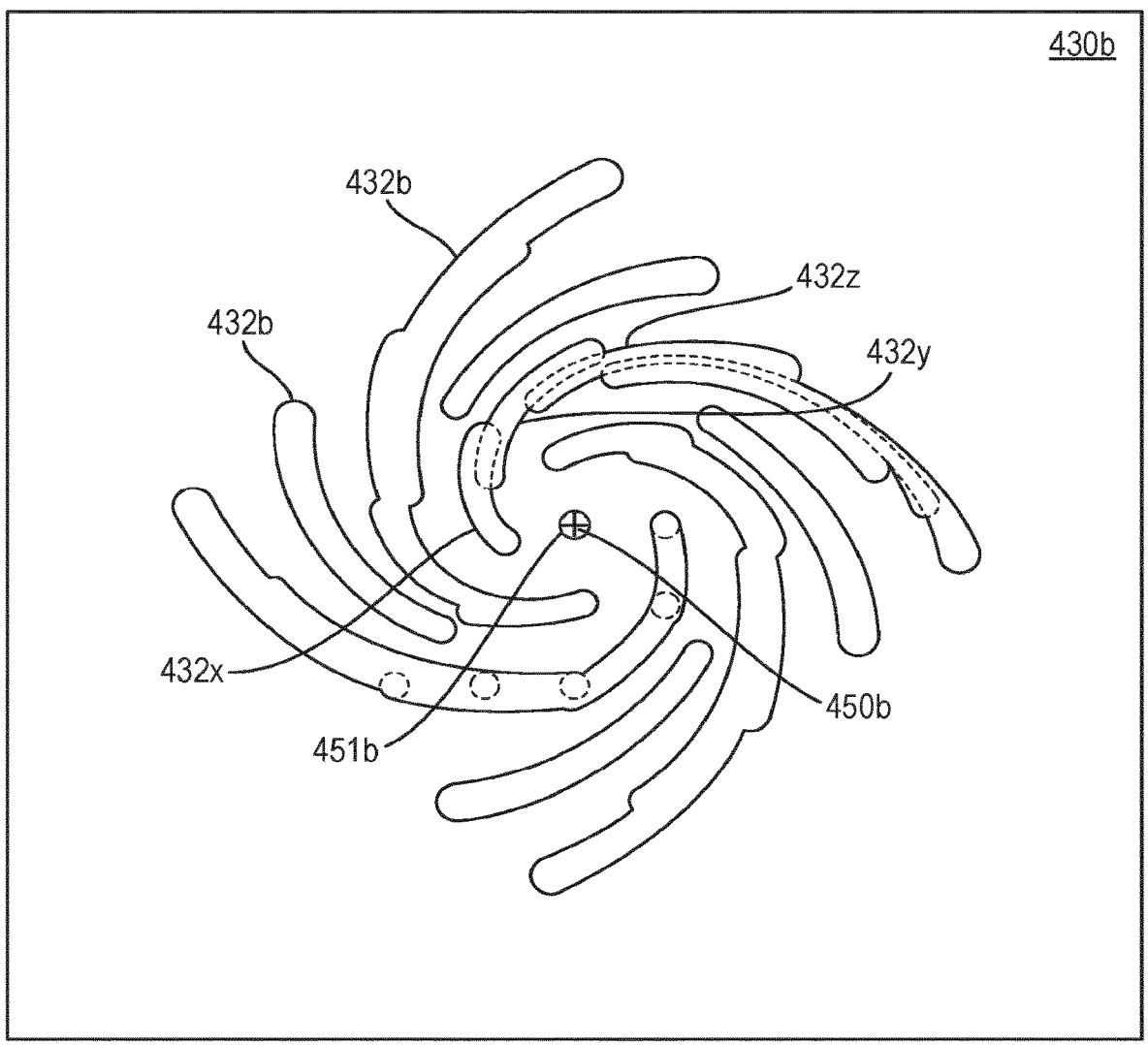
FIG. 8 schematically depicts, in plan view, an example of an aperture array for use with a condenser lens system to achieve optimal resolution.

FIG. 8 schematically shows an example of an aperture array 430b that may be used to achieve optimal or substantially optimal resolution. The aperture array 430b may be used with a condenser lens system 410 configured for simultaneous magnification M and rotation θ in accordance with the equations above. The aperture array 430b may be used with beam-limit array 420 described in relation to FIG. 6. In the aperture array 430b is defined an array of apertures 432b. The array of apertures 432b may generate, from the upbeam charged particle source 401, charged particle beam paths 406 downbeam of the aperture array 430b.

The aperture array 430b comprises a center 450b. The aperture array 430b may comprise a central aperture 451b. The central aperture 451b may be aligned with the center 450b. The center 450b may be aligned with the axis 404 in the charged particle system 400.

As shown in FIG. 8, the off-center apertures 432b of the aperture array 430b may be curved. The off-center apertures 432b may widen with increasing displacement from the center 450b of the aperture array 430b. The apertures 432b extend radially outwardly in a different manner from the apertures 432a of the aperture array 430a of FIG. 7. This is because the apertures 432b are shaped for a continual variable rotation of the charged particle beam paths 406, at the same time as continually varying the magnification of the charged particle beam paths 406. FIG. 8 shows the apertures 432b curving in a clockwise direction. Alternatively, the apertures 432b may curve in an anti-clockwise direction. The direction of curvature of the apertures 432b may be dependent on the configuration of the condenser lens system 410; specifically the direction of curvature of the apertures 432b may be determined by the net direction of rotation of the charged particle beam paths 406 through the condenser lens system 410. In some situations, the apertures 432b may be straight for optimal resolution at certain rotation/magnification settings.

The pattern of the aperture array 430b may thus correspond to a superposition of modified template patterns formed by simultaneous rotation and magnification of the template pattern. The modified template patterns may be formed by simultaneous rotation and magnification of the template pattern through a continuous range of rotations and magnifications. The rotation and magnification may be dependent on each other. The rotation and magnification may fulfill the mathematical equations I and II. Superposition of the template pattern may derive multiple apertures 432x, 432y, 432z (partly shown in dashed lines) in the aperture array that overlap. Thus the aperture array 430b may have an aperture 433a that corresponds to multiple apertures in the template pattern (and so multiple apertures in the beam-limit array 420). If only certain combinations of rotational and magnification positions must be catered for, a series of discrete openings at appropriate positions with the areas defined by slits 432 may suffice. This is indicated, for example, by the dashed circles.

The inventors have found that the aperture array 430b of FIG. 8 may be difficult to fabricate. The distances between adjacent apertures 432b may be very small. The material in which the apertures are defined, which may be referred to as connections between the apertures, may be small and challenging to fabricate. The curved form of the apertures 432b adds an increased level of complexity. The aperture array 430b may exhibit inadequate thermal conditioning performance. Heat is generated by the interaction of the charged particle beam 402 with the aperture array 430b. The complex pattern with small material connections may make conduction of heat away from aperture array 430b, for example from its center challenging. These drawbacks may increase with an increasing number of apertures 432b in the aperture array 430b, for example due to an increasing number of beamlets 408 in the beam arrangement of charged particle multi-beam.

Figure 9A:
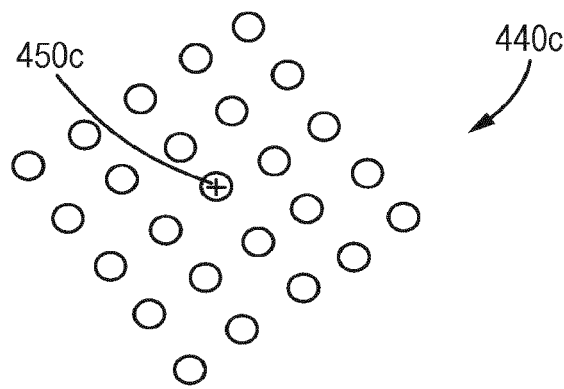
FIGS. 9a-d schematically depict examples of patterns that may be superposed to form a pattern of an aperture array for use with a condenser lens system operating at different rotation settings.
Figure 9B:
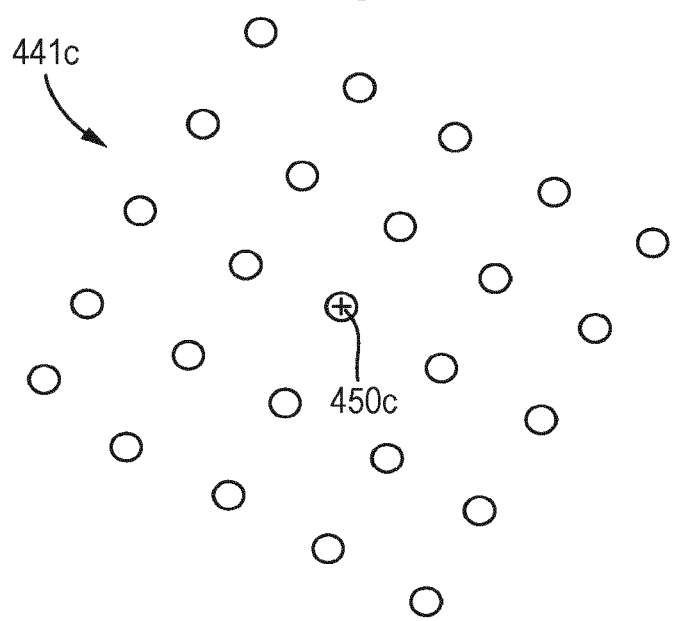
Figure 9C:
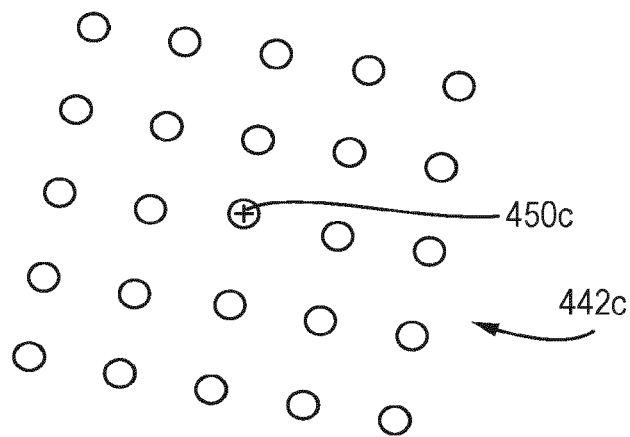
Figure 9D:
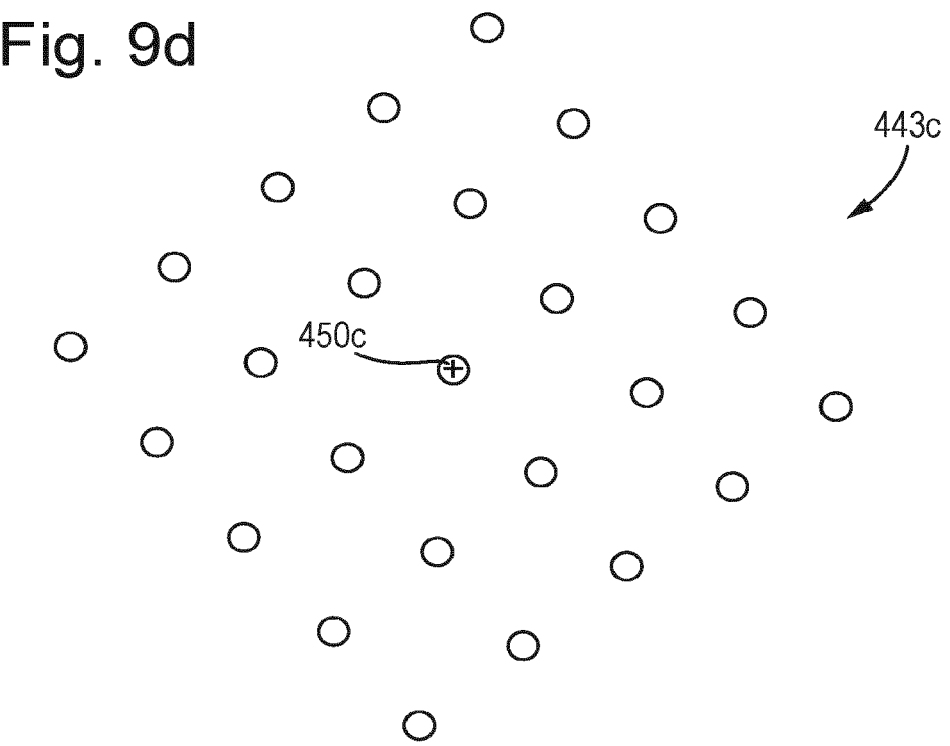
Figure 9E:
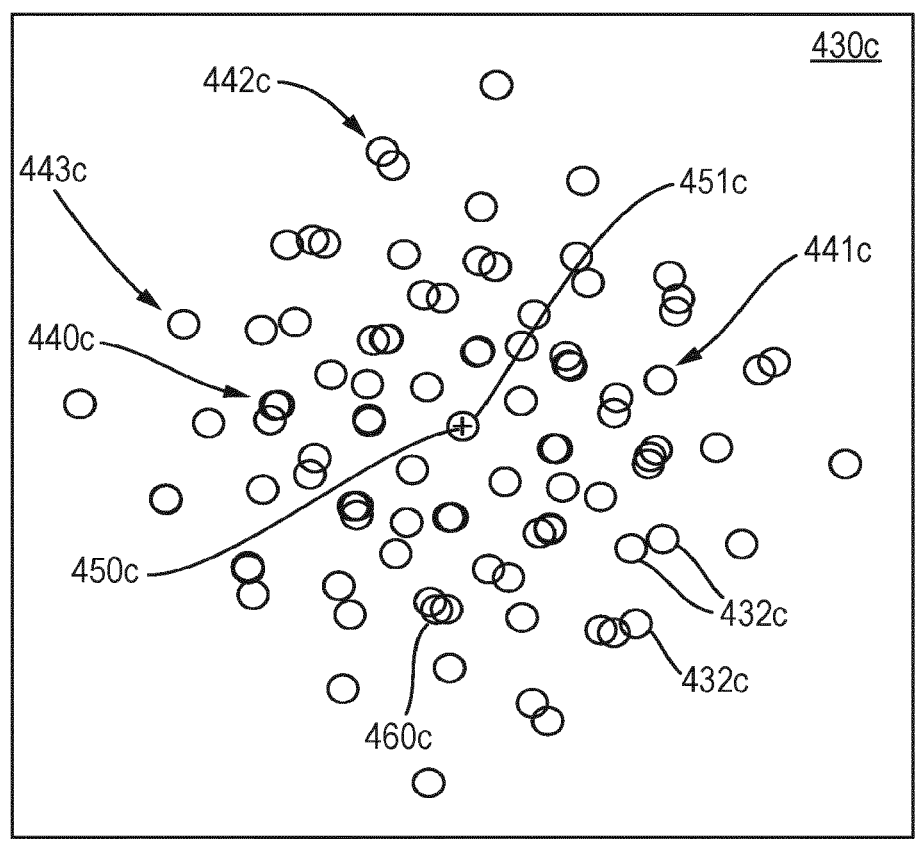
FIG. 9e schematically depicts, in plan view, an aperture array comprising a patterns formed of a superposition of the patterns of FIGS. 9a-d, according to some embodiments of the present disclosure.
Figure 10:
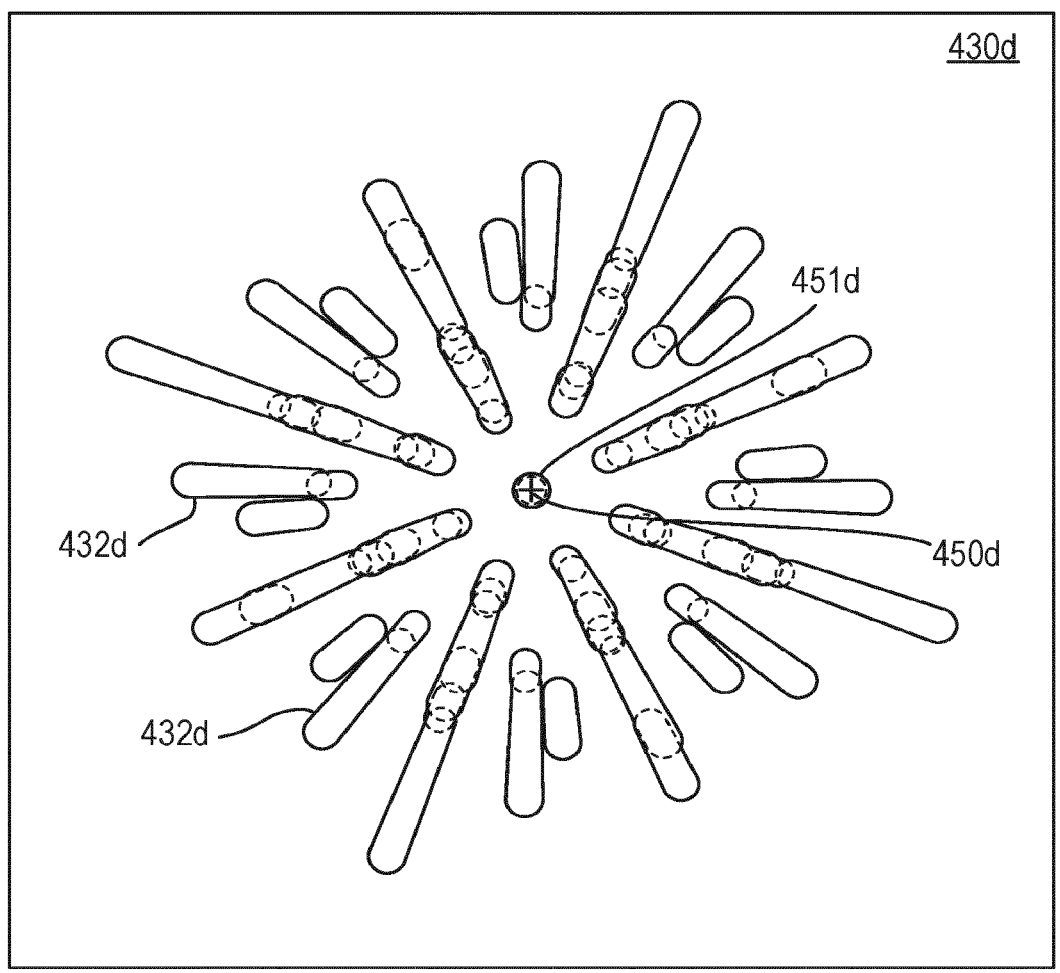
FIG. 10 schematically depicts, in plan view, an aperture array for use with a condenser lens system operating at different rotation settings and ranges of magnification settings, according to some embodiments of the present disclosure.

FIGS. 9-11 show aperture arrays 430 that at least partly address these drawbacks of the aperture array 430b. These aperture arrays 430 are compatible with operation of the condenser lens system 410 at a number of rotation settings; this is instead of the single zero-rotation setting described with reference to FIGS. 5b and 7 or the continually varying rotation described with reference to FIG. 8.

The condenser lens system 410 may thus be configured to selectively operate at different rotation settings, i.e. one of a number of rotation settings, for example being two or more. The different rotation settings may be a predetermined or preset number rotation settings, in particular of discrete and different rotation settings. The different rotation settings may define different charged particle beam paths 406, or in particular a different range of charged particle beam paths 406, between the aperture array 430 and the beam-limit array 420. The apertures 432 of the aperture array 420 are configured so that, at a rotation setting of the condenser lens system 410, all the beam-limit apertures 422 of the beam-limit array 420 lie on the charged particle beam paths 406 downbeam of the aperture array 430. The beam-limit apertures 422 may thus be exposed to or illuminated by the charged particle beam 402 propagating along the charged particle beam paths 406.

At one or more (preferably at all) of the different rotation settings, an aperture 432 of the aperture array 430 defines a beam path 406 from the aperture array 430 to the beam-limit array 420. The defined beam path 406 may be configured to provide substantially optimal resolution downbeam of the beam-limit array 420.

The principal plane of the condenser lens system 410 is moveable along the axis 404. The principal plane of the condenser lens system 410 may be positioned closer to the aperture array 430 than to the beam-limit array 420 for at least one, preferably all, of the different rotation settings. The position of the principal plane of the condenser lens system may be moved relatively closer to the aperture array than when using the aperture array 430a, 430b, of the arrangements in FIGS. 7 and 8. The inventors have found that moving the principal plane of the condenser lens system 410 towards the aperture array 430 may improve the resolution of the probe spot in some situations. Alternatively or additionally, for some rotation/magnification settings of the condenser lens system 410, it may be beneficial to move the principal plane towards the beam-limit aperture instead.

FIG. 9 schematically shows an example of an aperture array 430c for use with the condenser lens system 410 operating at different rotation settings. The aperture array 430c may be used with the beam-limit array 420 described in relation to FIG. 6. The aperture array 430c may comprise a center 450c. The aperture array 430c may comprise a central aperture 451c. The central aperture 451c may be aligned with the center 450c. The center 450c may be aligned with the axis 404 in the charged particle system 400.

The aperture array 430c comprises a pattern of apertures 432c. The pattern may comprise or consist of a superposition of the template pattern (described in relation to FIG. 7) at different magnifications and at corresponding different rotations. Each of the different magnifications may comprise a single value of magnification. Each of the different rotation settings may comprise a corresponding single value of rotation.

The template pattern may, for example, correspond to the beam-limit array 420 described in relation to FIG. 6. This is shown in FIGS. 9a-e. In particular, the pattern of the apertures 432c may comprise or consist of a superposition of i) the template pattern 440c at a first rotation setting (or first rotation) about the center 450c and at a first magnification setting (or first magnification) (see FIG. 9a), ii) the template pattern 441c at a second rotation setting (or second rotation) about the center 450c and at a second magnification (or second magnification setting) (See FIG. 9b), iii) optionally further template patterns 442c, 443c at further respective rotations (further rotation settings) and further respective magnifications (further magnification settings) (see FIGS. 9c and 9d). FIG. 9e shows an aperture array 430c with a pattern comprising or consisting of a superposition of the first, second and further rotation/magnification template patterns 440c, 441c, 442c, 443c of FIGS. 9a to 9d. In the depicted example, the different relative rotation settings shown between the different template patterns are: −45, −22.5, 0, and 22.5 degrees. The example of FIGS. 9a-e is based on the template pattern corresponding to the beam-limit array 420 of FIG. 6, in which is defined a regular (5×5) array of circular beam-limit apertures 422. The design of the aperture array 430c will change for other template patterns, for example when the aperture array 430c is to be used with other beam-limit arrays 420. The aperture array 430c can be constructed from a superposition of different rotations and magnifications of any template pattern (i.e. any design of the beam-limit aperture 420). The template aperture array may be any array of apertures, preferably a square or hexagonal array, further preferably a regular array, further preferably an array of circular apertures.

The apertures 432c in the aperture array 430c may have or comprise the same shape as a corresponding aperture 422 in the beam-limit array 420. As shown in FIG. 9e, some of superposed template patterns may overlap. That is, an aperture 432c in the aperture array 430c may comprise a superposition of portions of two or more different template patterns. For example, the aperture 460c in the aperture array 430c corresponds to an overlap of three of the template patterns 440c, 441c, 443c. The central aperture 432c of the aperture array 430c may usually be shaped to correspond to the central aperture 422 of the beam-limit array 430 at the largest magnification.

The magnification and rotation corresponding to each of the above-described modified template patterns may correspond (e.g. be inverse to) to the magnification M and a corresponding rotation θ. The different pairs of rotation setting and magnification setting of the condenser lens system 410 may thus be configured to achieve substantially optimal resolution downbeam of the beam-limit array, e.g. at the probing spot on the sample. The pairs of rotation setting and magnification setting of the condenser lens system 410 may fulfill the equations I and II for magnification M and rotation θ described above in relation to FIG. 8. As such, an aperture 432c of the aperture array 430c of FIG. 9e may be at a position which would correspond to a curved aperture 432b in the pattern of the aperture array 432b of FIG. 8. Such positioning of the apertures 432c may improve or optimize the resolution of the charged-particle multi-beam 408 downbeam of the beam-limit array 420.

The aperture array 430c of FIG. 9e, and the manner of operating the condenser lens system 410 as described in relation to FIG. 9e, thus may allow for improved resolution at different magnifications compared to the configuration described in relation to FIG. 7. FIG. 14, for example, shows four points 601c, 602c, 603c, 604c corresponding to four different rotation/magnification settings of the condenser lens array 410. Each rotation/magnification setting results in a distinct probe current and probe resolution. The four points 601c, 602c, 603c, 604c lie on the curve 601b that corresponds to the optimal resolution that can be achieved for each probe current. The aperture array 430c of FIG. 9e may be easier to fabricate than the aperture array 430b of FIG. 8, especially for arrays used with an increasing number of beamlets. Thermal conditioning performance may be improved relative to the aperture array 430b of FIG. 8. Heat generated by interaction between the charged particle beam 402 and the aperture array may be conducted by the material between the apertures. The greater quantity of material relative to that present in the aperture array 430b of FIG. 8 may more readily conduct heat away from the aperture array 430c, for example from the center of the aperture array 430c.

However, the aperture array 430c allows for operation of the condenser lens system 410 only at a limited number of discrete magnification settings. This limits the ability of adjustment of the magnification setting of the condenser lens system 410 to control the probe current. With reference to the example of FIG. 14, the probe current may be set to four discrete values, but not within continuous range of probe currents.

FIG. 10 schematically shows an example of an aperture array 430d for use with a condenser lens system 410 operating at a number of rotation settings. The number of rotation settings may be two or more. The aperture array 430c may be for use with the beam-limit array 420 described in relation to FIG. 6. Compared to the aperture array 430c of FIG. 9, the aperture array 430d of FIG. 10 may provide improved control of the probe current using the condenser lens system 410. The improved control of the probe current is achieved by enabling at the different rotation settings, variation of the magnification setting over a sub-range of the magnification setting range. For example, curve 601d of FIG. 14 shows the probe resolution/probe current relationship that may be achieved by operating a condenser lens system 410 in combination with the aperture array 430d of FIG. 10. As shown, the probe resolution may be maintained close to the optimal probe resolution of curve 601b, while at the same time allowing adjustment of the probe current within a range of probe currents.

The aperture array 430d may comprise a center 450d. The aperture array 430d may comprise a central aperture 451d. The central aperture 451d may be aligned with the center 450d, i.e. a center of the central aperture 451d may coincide with the center 450d. The center 450d may be aligned with the axis 404 in the charged particle system 400.

Figure 11A:
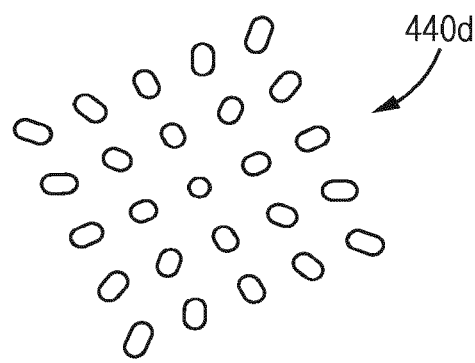
FIGS. 11a-c schematically depict patterns that may be superposed to form the pattern of the aperture array of FIG. 10.
Figure 11B:
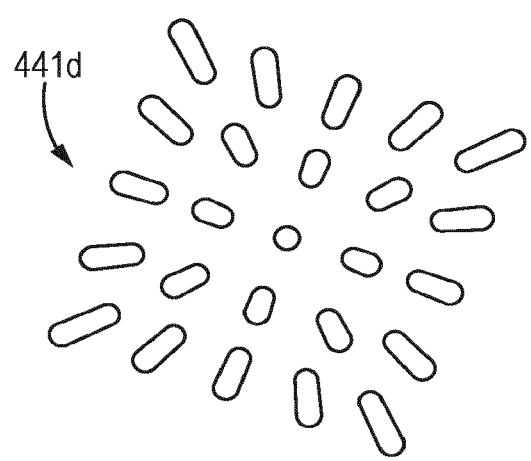
Figure 11C:
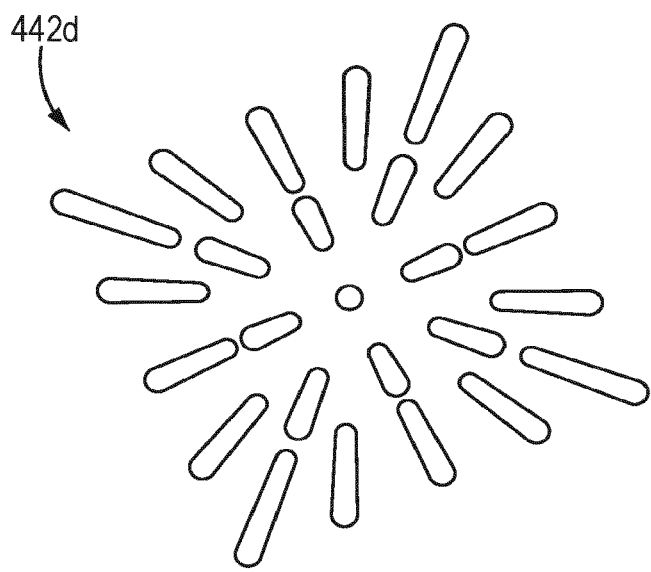

The aperture array 430d comprises a pattern of apertures 432d. The pattern of apertures 432d may comprise a superposition of different patterns of apertures 432a described in relation to FIG. 7, wherein each of the different pattern differs in rotation and in the range of magnification. FIGS. 11a-c schematically show three exemplary aperture arrays as described in relation to FIG. 7. However, the three aperture arrays are set at different relative rotation settings. As pictured, all are set away from the zero-rotation setting. The three different aperture patterns, which as components of an aperture pattern of an aperture array may be referred to as pattern arrays, 440d, 441d, 442d of FIGS. 11a-c are, suited to different magnification ranges at specific, fixed rotation settings. The different aperture patterns 440d, 441d, 442d are a superposition of a template pattern over different ranges of magnification at a fixed rotation relative to the centre 450d. The magnification ranges of the different aperture arrays 440d, 441d, 442d, are sub-ranges of a larger range. That is the sub ranges are distinct and apart; they are non-continuous, non-contiguous and do not overlap. For example, FIG. 11a shows a pattern array that is a superposition 440d of the template pattern at a rotation of −25 degrees over a magnification sub-range from 7.2 to 8.2. FIG. 11b shows a pattern array that is a superposition 441d of the template pattern at a rotation of +20 degrees over a magnification sub-range from 5.5 to 6.9. FIG. 11c shows a pattern array that is a superposition 442d of the template pattern at a rotation of +65 degrees over a magnification sub-range from 3.3 to 5.5.

The pattern of the apertures 432d in the aperture array 430d of FIG. 10 comprises or consists of a superposition of the pattern arrays 440d, 441d, 442d of FIGS. 11a-c. In general terms, the pattern of apertures 432d of FIG. 10 comprises or consists of a superposition of i) first pattern array 440d being a superposition of the template pattern continuously over a first sub-range of magnifications at a first rotation about the centre 450d, and ii) second pattern array 441d 440d being a superposition of the template pattern continuously over a second sub-range of magnifications at a second rotation about the centre 450d. Optionally, the aperture patter may be a superposition of aperture patterns that includes a further pattern array 442d, being a superposition of the template pattern continuously over further sub-ranges of magnification at further rotations about the centre 450d. The aperture array 430d may be a superposition of as many pattern arrays as desired, each pattern array being a superposition of the template pattern over a sub-range of magnifications at corresponding rotation setting about the centre 450d.

Preferably, the first sub-range of magnifications, the second sub-range of magnifications, and optionally the one or more further sub-ranges of magnification, are distinct. They may be spaced part; that is, they do not overlap. This may reduce the proportion of the surface of area of the aperture array 430d in which the apertures 432d are defined. Thus the area of material between the apertures 432d may be increased. The aperture array 430d may be easier to fabricate (especially for larger arrays) and demonstrate improved thermal conditioning performance; the rate of heat transfer away from the centre 450d of the aperture array 430d may be increased. Alternatively, there may be an overlap between the first, second and/or further sub-ranges of magnification. The first, second and/or further sub-ranges of magnification could also be adjacent to one another, for example at least contiguous, so as to cover a greater proposition of the magnification range, if not all of the magnification range.

Preferably, the first rotation, the second rotation, and optionally a further rotation, are rotationally offset apart by 45 degrees or by 60 degrees. A rotational offset of 45 degrees may take advantage of the inherent rotational symmetry of the aperture array 430a constructed from a square template pattern. Such a rotational offset may thus ensure that the template patterns of different rotations overlap. A single aperture 432d of the aperture array 430d may thus correspond to different apertures 422 of the beam-limit array 420 at different rotation settings. Over the magnification range (i.e., range of probing current) the resolution may be optimised for as many rotations for which the aperture array is designed. Similarly, a rotational offset of 60 degrees may take advantage of the inherent rotational symmetry of the aperture array 430a constructed from a hexagonal template pattern (e.g., when the aperture array 430d is used in combination with a hexagonal beam-limit array 420). This may have the same benefit over the magnification setting range (i.e., probing current range): each rotation setting has a magnification setting sub-range, at least part of which is optimised for improved resolution.

The first rotation, the second rotation, and optionally the one or more further rotations, may also be rotationally offset by multiples of 45 degrees (e.g., 90 degrees or 135 degrees, etc) or multiples of 60 degrees (e.g., 120 degrees). The first rotation, the second rotation, and optionally the one or more further rotations, may also be rotationally offset by an angle of arctan(1/n), where n is an integer. For example, the rotational offset may be 22.5 degrees. The first rotation, the second rotation, and optionally a further rotation, such as for a hexagonal beam arrangement may be rotationally offset by a fraction of 60 degrees, for example by an angle of 30 degrees or 15 degrees. However, smaller rotational offsets may decrease the distance between adjacent apertures 432d, and so may make fabrication of the aperture array 430d more difficult and/or negatively affect heat transfer from the centre 450d of the aperture array 430d.

Additionally or alternatively, the different rotation settings may differ from each other by non-uniform rotational offsets, for example of any selected value.

The first pattern array 441d, the second pattern array 442d and optionally a further pattern array 443d may each be derived from the template pattern described in relation to in FIG. 8. As such, each of the first aperture pattern 441d, the second aperture pattern 442d and optionally a further aperture pattern 443d, when incorporated in an aperture array 430, may provide for substantially optimal resolution of the probing beam at the sample, e.g., downbeam of the beam-limit array 420. In general terms, the first aperture pattern 441d, the second aperture pattern 442d and optionally the further aperture pattern 443d may each comprise a pair of rotation and magnification settings that fulfils the mathematical equations I and II described above. The pair of rotation and magnification settings may thus, for each respective aperture pattern, achieve substantially optimal resolution of the probe spot.

As shown in FIG. 10, the pattern of apertures 432d may comprise (as off-center apertures 432d) a plurality of elongate slits. The elongate slits extend radially away from the center 450d, optionally from the central aperture 451d. The elongate slits are positioned radially away from the central aperture 451d. The elongate slits are tapered such that they widen further away from the center. So, the elongate slits widen with displacement from the central aperture 451d. The different aperture patterns 440d, 441d, 442d which define the elongate slits may be oriented at an angle of 45 degrees with respect to each other (e.g. when the aperture array 430d is used with a square beam-limit aperture 420). As an elongate aperture may have a corresponding aperture in the other aperture patterns, these corresponding apertures may be offset from each other by 45 degrees. Alternatively, the different aperture patterns to which the elongate slits belong may be are oriented at an angle of 60 degrees with respect to each other (e.g. when the aperture array 430d is adapted for use with a beam-limit aperture having an aperture pattern for a hexagonal beam arrangement). The corresponding elongate slits from the aperture patterns at different rotation settings may also be oriented at other angles with respect to each other, e.g. at any of the angles described above in relation to the different rotation settings, e.g. the first rotation, the second rotation, and the further rotation. The aperture pattern of the aperture array 430d may have a rotational symmetry of multiples of 2 fold (e.g., when based on a parallelogram template pattern), 4 fold (e.g., when based on a square template pattern) or 6 fold (e.g., when based on a hexagonal template pattern).

The aperture array 430d may be used as the aperture array 430 in the charged particle system 400 described with reference to FIG. 4.

The condenser lens system 410 may be configured to selectively operate at one of a number of rotation settings. The number of rotation settings is two or more. The number of rotation settings may be a predetermined set of discrete rotation settings (e.g. −25 degrees, 20 degrees and 65 degrees, as described with reference to FIGS. 11a-c, or alternatively −45, 0, +45 degrees). The condenser lens system 410 may selectively rotate the charged particle beam paths 406 at a number of preset rotations, for example corresponding to the first, second and further rotations described in relation to FIG. 10. Each rotation setting may define a different range of beam paths between the aperture array 430d and the beam-limit array 420. Thus a beam-limit apertures 422 of the beam-limit array 420 is on a charged particle beam path 406 downbeam of the aperture array 430d for each rotation setting of the condenser lens system 410.

The condenser lens system 410 may be configured to adjust the magnification of the charged particle beam paths 406 within a respective magnification sub-range for each rotation setting. So, the condenser lens system 410 may operate within a sub-range of magnification settings for each rotation setting. The magnification setting sub-range for each rotation setting may be the inverse to the first, second or further magnification sub-range for the first, second or further rotation described in relation to FIG. 10. As such the condenser lens system 410 may be configured to variably adjust the magnification setting within a corresponding sub-range, at a specific rotation setting, The apertures 432d of the aperture array 430d are configured so that, at a magnification setting with a magnification sub-range and corresponding rotation setting, the beam-limit apertures 422 of the beam-limit array 420 all are on the charged particle beam paths 406.

At a beam rotation setting, the apertures 432d of the aperture array 430d are configured such that each beam-limit aperture 422 of the beam-limit array 420 lies on the charged particle beam paths for the (preferably entire) respective sub-range of magnifications. So, all the beam-limit aperture 422 may be exposed to or illuminated by the charged particle beam 402 propagating along the charged particle beam paths 406, for the full sub-range of magnification settings and at the corresponding rotation setting.

The apertures 432d of the aperture array 430d may defines charged particle beam paths 406 that are configured to provide for substantially optimal resolution downbeam of the beam-limit array (i.e. substantially optimal resolution of the probe spot) over at least one, preferably all, of the rotation settings. The apertures 432d of the aperture array 430 may enable for at least one pair of rotation θ and magnification M that fulfills the equations I and II described in relation to FIG. 8.

Preferably, at least two of the apertures 432d of the aperture array 430d define charged particle beam paths 406 for multiple of the number of rotation settings. So, at least two of the apertures 432d (e.g. the central aperture 451d and at least one off-center aperture 432d) may be shared by different rotation settings. For example an off-center aperture 432d may define a charged particle beam path 406 to a corresponding aperture 422 of the beam-limit array 420 at a first rotation setting. The same off-center aperture 432d may define a charged particle beam path 406 to a different aperture 422 of the beam-limit array 420 at a second rotation setting. Thus two or more apertures 432d, each at a different rotation setting, may thus define a corresponding charged particle beam path 406 from the aperture array 430d to the beam-limit array 420.

Preferably, the number of rotation settings includes (preferably only includes) rotation settings other than the zero-rotation setting described in relation to FIG. 7. The inventors have found that providing at least some rotation (rather than a rotation setting of zero) using the condenser lens system 410 may allow for improved resolution of the probe spot. The rotation settings may be distributed over a preferred rotational range. For example, the number of beam-rotation settings may include rotations of −25 degrees, 20 degrees and 65 degrees, as in the example of FIG. 11a-c, and may not include rotations of 0 degrees.

As described above, the condenser lens system 410 may be configured to selectively operate at one of a number of rotation settings when using the aperture array 430d of FIG.

10. In a different example using the aperture array 430*a* of FIG. 7 in conjunction with the condenser lens system 410, the condenser lens may selectively operate at different rotation settings. So the aperture array 430*a* of FIG. 7 may be used at multiple rotation settings instead of a fixed rotation setting such as at a zero-rotation setting. This is because, the aperture array 430*a* exhibits an inherent 90 degree symmetry. Rotating the aperture array 430*a* by 90 degrees will yield a pattern that is identical to the non-rotated aperture array 430*a*. The condenser lens system 410 may thus operate at one of a number of rotation settings (for example at 0 degree and a 90 degree rotation, or at −45 and +45 degree rotation) using the aperture array 430*a* of FIG. 7.

Figure 12:
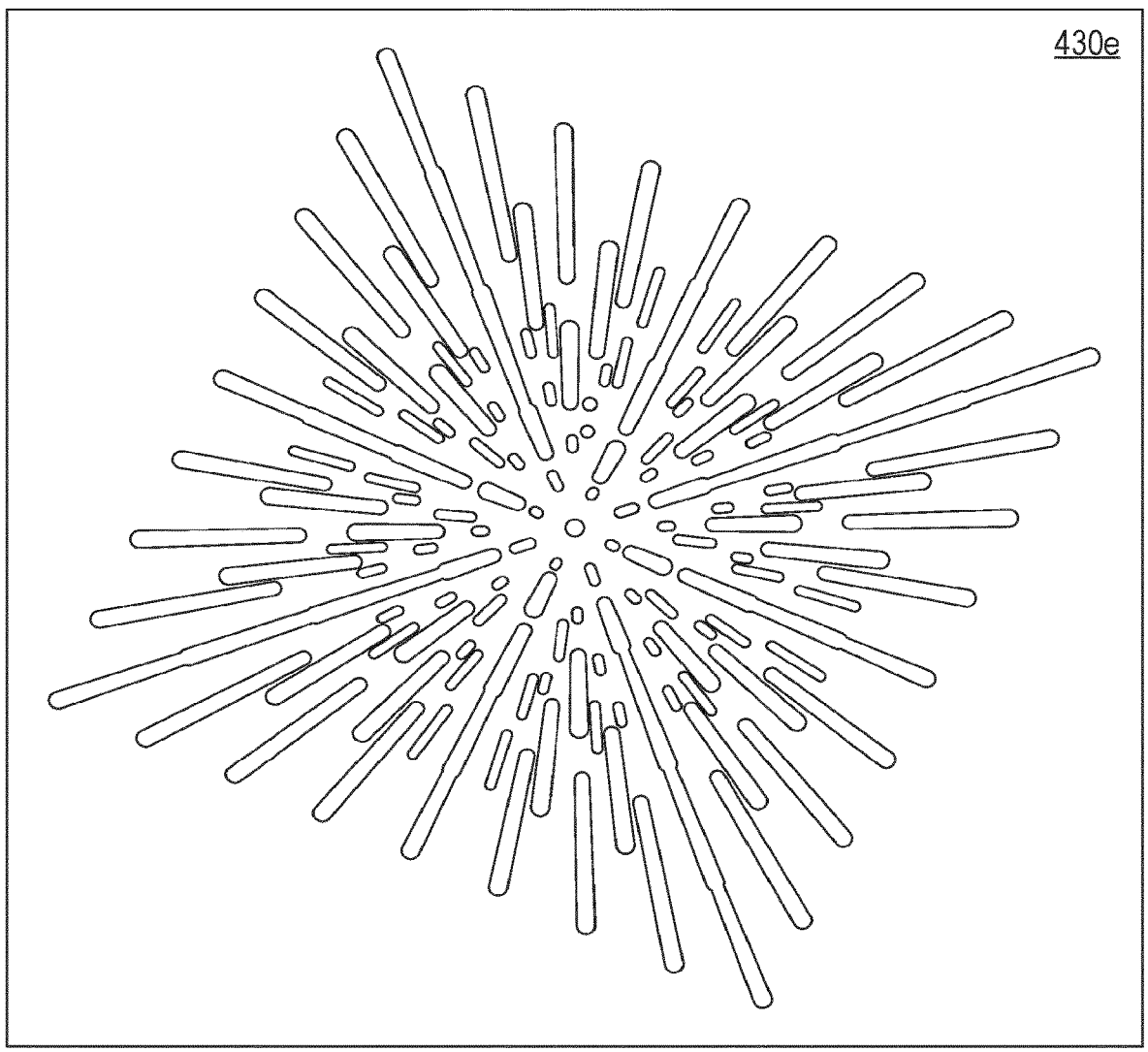
FIG. 12 schematically depicts, in plan view, an aperture array for use with a 9×9 beam-limit array and a condenser lens system operating at different rotation settings and ranges of magnification settings, according to some embodiments of the present disclosure.

The aperture array 430*d* depicted in FIG. 10 is compatible with the beam-limit array 420 of FIG. 6, i.e. with a 5×5 square array. The aperture array 430*d* depicted in FIG. 10 comprises a superposition of 5×5 square template patterns. The concepts described herein may be extended to create aperture arrays 430 that are compatible with any other beam-limit array 420. For example, FIG. 12 schematically shows an example of an aperture array 430*e* that is compatible with a 9×9 square beam-limit array 420 and allows use of the condenser lens system at three different rotation settings (e.g. at −25 degrees, +20 degrees and +65 degrees).

Figure 13:
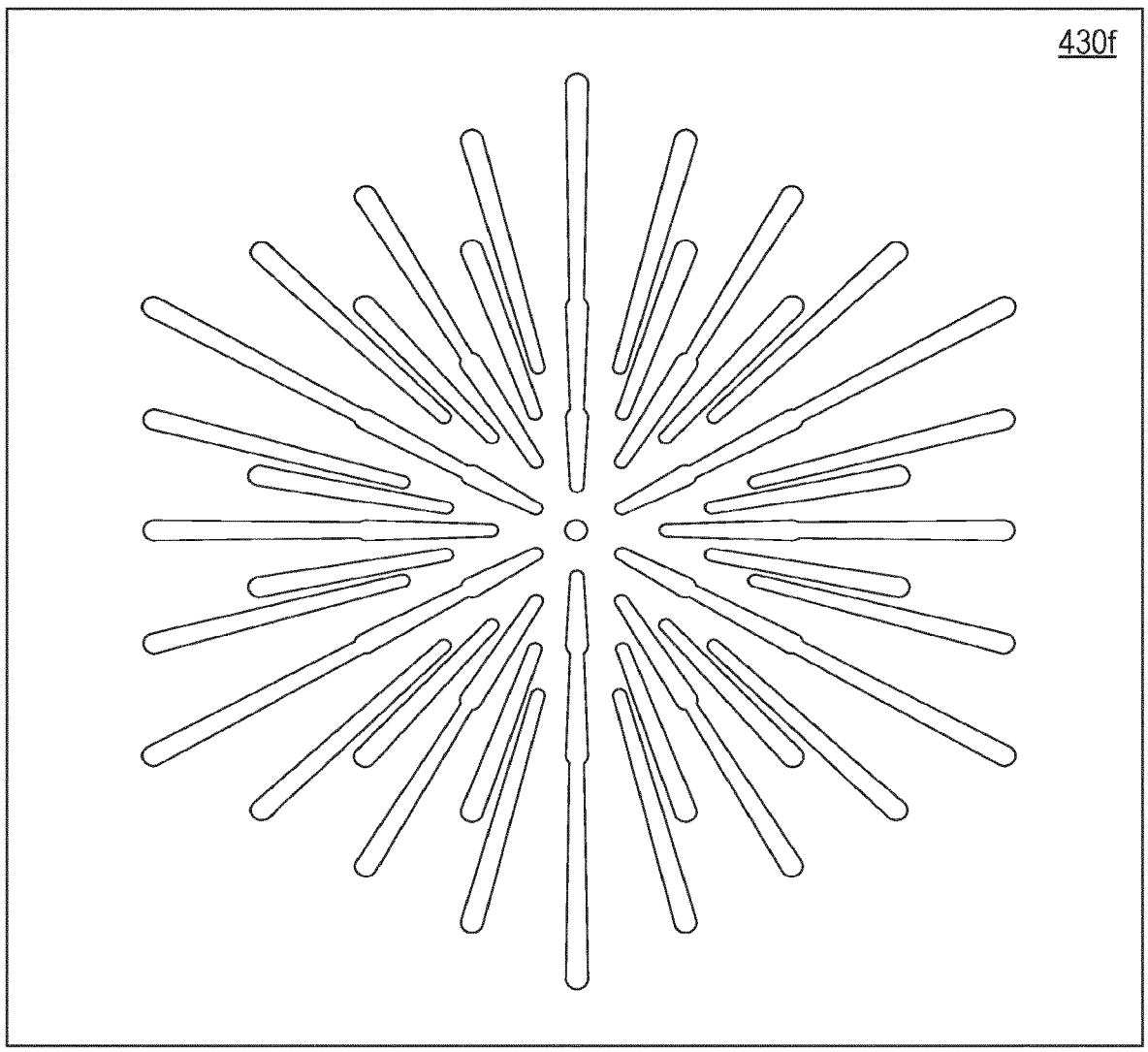
FIG. 13 schematically depicts, in plan view, an aperture array for use with a hexagonal beam-limit array and a condenser lens system condenser lens system operating at different rotation settings and ranges of magnification settings, according to some embodiments of the present disclosure.

FIG. 13 schematically shows an example of an aperture array 430*f* that is compatible with a hexagonal array and allows use of the condenser lens system at three different rotation settings (e.g. at −60 degrees, 0 degrees, and +60 degrees). The design of the aperture array 430*f* takes advantage of the inherent 60 degree symmetry of a hexagonal aperture array. Rotating the aperture array 430*f* by 60 degrees will yield a pattern that is identical to that of the aperture array 430*f* at no rotation. As such, the aperture array 430*f* may be used with a condenser lens system 410 operating at multiple rotation settings that are offset from each other by 60 degrees.

A method of operating the charged particle system 400 may also be provided. The charged particle system 400 comprising the aperture array 430*c*, 430*d* in which is defined an array of apertures 432*c*, 432*d*. The charged particle system 400 further comprises the beam-limit array 420. The beam-limit array 420 is arranged downbeam of the aperture array 430*d*. In the beam-limit array 420 is defined an array of beam-limit apertures 422. The condenser lens system 410 is arranged between the aperture array 430*c*, 430*d* and the beam-limit array 420. The method comprises passing a charged particle beam 402 through the apertures 432*d* of the aperture array 430*d*. The method further comprises operating the condenser lens system 410 at two or more different rotation settings. Each rotation setting defines a different charged particle beam path 406 between the aperture array 430*d* and the beam-limit array 420. For each rotation setting, the method includes directing the charged particles from the aperture array 430*d* through each of the beam-limit apertures 422 of the beam-limit array 420. Each of the beam-limit apertures 422 may be fully exposed to or illuminated by the charged particle beam paths 406.

The condenser lens system may further be operated to vary, at each of the two or more different rotation settings, the magnification setting, that may be applied to the charged particle beam paths 406, within a respective sub-range of magnification settings. The sub-ranges of magnification settings of different rotation settings may be distinct; that is not overlap. For each magnification setting within the sub-range and for the respective rotation setting, the method may include directing the charged particles from the aperture array 430*d* through each of the beam-limit apertures 422 of the beam-limit array 420. Thus such directing may comprise directing the charged particles through the condenser lens.

While the embodiments of the present disclosure have been described in connection with various examples, other embodiments will be apparent to those skilled in the art from consideration of the specification and practice of the technology disclosed herein. It is intended that the specification and examples be considered as exemplary only, with a true scope and spirit of the invention being indicated by the following claims. Reference to inspection throughout this specification is intended also to refer to measurement, i.e. metrological applications. The following clauses describe various embodiments of the present disclosure.

1. A charged particle system for generating a charged particle multi beam along a charged particle multi beam path, the charged particle system comprising: an aperture array in which is defined an array of apertures configured to generate from an upbeam charged particle source charged particle paths downbeam of the aperture array;
a beam-limit array arranged downbeam of the aperture array and in which is defined an array of beam-limit apertures for shaping the charged particle multi beam path, a condenser lens system arranged between the aperture array and the beam-limit array, wherein the condenser lens system is configured to selectively operate at one of a number of rotation settings, the number of rotation settings preferably being two or more, each rotation setting defining a different range of beam paths between the aperture array and the beam-limit array; wherein the apertures of the aperture array are configured so that, at each rotation setting of the condenser lens system, each beam-limit aperture of the beam-limit array lies on a charged particle beam path downbeam of the aperture array.
2. The charged particle system of clause 1, wherein the charged particle beam paths from the aperture array to the beam-limit array are dependent on the magnification applied to the charged particle beam paths between the aperture array and the beam-limit array.
3. The charged particle system of clause 1 or 2, wherein the charged particle beam paths from the aperture array to the beam-limit array are dependent on the rotation applied to the charged particle beam paths between the aperture array and the beam-limit array.
4. The charged particle system of any one of the preceding clauses, wherein the charged particle beam paths from the aperture array to the beam-limit array are dependent on the rotation and magnification applied to the charged particle beam paths between the aperture array and the beam-limit array, wherein the magnification and rotation are dependent on each other.
5. The charged particle system of clause 4, wherein the magnification and rotation are dependent on each other so as to achieve substantially optimal resolution of the charged particle multi-beam downbeam of the beam-limit aperture.
6. The charged particle system of any one of the preceding clauses, wherein at least two of the apertures of the aperture array define beam paths for multiple of the number of rotation settings from the aperture array to the beam-limit array.
7. The charged particle system of any one of the preceding clauses, wherein the condenser lens system is configured to adjust the magnification of the charged particle beam paths within a respective magnification sub-range for each rotation setting.

8. The charged particle system of clause 7, wherein the apertures of the aperture array are configured so that, at each magnification of each magnification sub-range, each beam-limit aperture of the beam-limit array lies on a charged particle beam path from the aperture array to the beam-limit array at the rotation setting corresponding to the respective magnification sub-range.

9. The charged particle system of any one of the preceding clauses, wherein the apertures of the aperture array form a pattern comprising a plurality of elongate slits and an optional central aperture.

10. The charged particle system of clause 9, wherein the elongate slits extend radially away from a center of the aperture array, optionally wherein the center is aligned with the central aperture.

11. The charged particle system of clause 9 or 10, wherein the elongate slits are tapered such that they widen further from the center, optionally further from the central aperture, preferably wherein the elongate slits widen with displacement from the central aperture.

12. The charged particle system of any one of clauses 9 to 11, wherein the pattern comprises a superposition of: a template pattern at a first rotation about the center and a first magnification, and the template pattern at a second rotation about the center and a second magnification.

13. The charged particle system of clause 12, wherein: the first magnification comprises a first sub-range of magnifications at the first rotation about the center, and the second magnification comprises a second sub-range of magnifications at the second rotation about the center.

14. The charged particle system of clause 13, wherein the first sub-range of magnifications, the second sub-range of magnifications, and optionally the one or more further sub-ranges of magnification are apart, preferable further apart than contiguous.

15. The charged particle system of any one of clauses 12 to 14, wherein the template pattern comprises a square or hexagonal pattern of apertures, preferably a regular pattern, further preferably a pattern of circular apertures.

16. The charged particle system of any one of clauses 12 to 15, wherein the first rotation, the second rotation, and optionally the further rotations, are rotationally offset by 45 degrees or by 60 degrees.

17. The charged particle system of any one of clauses 9 to 16, wherein the pattern has a rotational symmetry of multiples of 2 or 4 or 6 fold.

18. The charged particle system of any one of the preceding clauses, wherein the number of rotation settings comprises rotational offsets of 45 degrees with respect to each other.

19. The charged particle system of any one of the preceding clauses, wherein the number of rotation settings comprises rotational offsets of 60 degrees with respect to each other.

20. The charged particle system of any one of the preceding clauses, wherein at the rotation settings the condenser lens system is configured to adjust the magnification of the charged particle beam paths to one of a set of predefined magnifications, wherein each pair of rotation setting and corresponding magnification are configured to achieve substantially optimal resolution downbeam of the beam-limit aperture.

21. The charged particle system of any one of the preceding clauses, wherein each aperture in the aperture array has the same shape as a corresponding aperture in the beam-limit array.

22. The charged particle system of any one of the preceding clauses, wherein in the beam-limit array is defined an array of beam-limit apertures, preferably a rectangular or hexagonal array of beam-limit apertures, more preferably a regular array.

23. The charged particle system of any one of the preceding clauses, wherein the condenser lens system comprises a magnetic lens, preferably at least two magnetic lenses.

24. The charged particle system of any one of the preceding clauses, wherein the number of selectable rotation settings includes rotation settings other than a zero-rotation setting, preferably all rotation setting are different from a zero-rotation setting.

25. An aperture array, the aperture array comprising a center and a pattern of apertures, wherein the pattern comprises a superposition of: a template pattern at a first rotation about the center and a first magnification, and the template pattern at a second rotation about the center and a second magnification.

26. The aperture array of clause 25, wherein: the first magnification comprises a first sub-range of magnifications at the first rotation about the center, and the second magnification comprises a second sub-range of magnifications at the second rotation about the center.

27. The aperture array of clause 26, wherein the first sub-range of magnifications, the second sub-range of magnifications, and optionally the one or more further sub-ranges of magnification are apart, preferable further apart than contiguous.

28. The aperture array of clause 25, wherein: the first magnification comprises a single value of magnification, and the second magnification comprises a single value of magnification.

29. The aperture array of any one of clauses 25 to 28, wherein the superposition further comprises the template pattern additionally at one or more further rotations about the center and at one or more further respective magnifications.

30. The aperture array of any one of clauses 25 to 29, wherein the template pattern comprises a square or hexagonal pattern of apertures, preferably a regular pattern, further preferably pattern of circular apertures.

31. The aperture array of any one of clauses 25 to 30, wherein each pair of i) the first rotation and the first magnification, ii) the second rotation and the second magnification, iii) optionally the respective further rotation and further magnification are a function of each other.

32. The aperture array of clause 31, wherein the function fulfils the mathematical equations $M=\alpha-\beta\varepsilon^2$ and $\theta=\kappa\varepsilon$, where M corresponds to the magnification, $\theta$ corresponds to the rotation, and $\alpha$, $\beta$, and $\kappa$ are constants and $\varepsilon$ is a variable.

33. The aperture array of any one of clauses 25 to 32, wherein the first rotation, the second rotation, and optionally the at least further rotation, are rotationally offset by 45 degrees or by 60 degrees.

34. An aperture array for use in the charged particle system of any one of clauses 1 to 24.

35. A charged particle tool comprising: the charged particle system of any preceding clause or a charged particle system comprising the aperture array of any preceding clause, wherein the charged particle system is configured to generate a charged particle multi-beam along the charged particle multi-beam path, and a charged particle projection system configured to direct the charged particle multi-beam along the charged particle multi-beam path onto a sample.

36. A method of operating a charged particle system comprising an aperture array in which is defined an array of apertures, a beam-limit array arranged downbeam of the aperture array and in which is defined an array of beam-limit apertures, and a condenser lens system arranged between the aperture array and the beam-limit array, the method comprising: passing a charged particle beam through the apertures of the aperture array; operating the condenser lens system at two or more different rotation settings, each rotation setting defining a different beam path between the aperture array and the beam-limit array; and for each rotation setting, directing the charged particles from the aperture array through each of the beam-limit apertures of the beam-limit array.

37. The method of clause 36, further comprising operating the condenser lens system, at each of the two or more different rotation settings, at variable magnification settings within a respective sub-range of magnification settings, for magnification settings within the sub-range of magnification settings and at the respective rotation setting, directing the charged particles from the aperture array through each of the beam-limit apertures of the beam-limit array.

The descriptions above are intended to be illustrative, not limiting. Thus, it will be apparent to one skilled in the art that modifications may be made as described without departing from the scope of the claims set out below.

The invention claimed is:

1. A charged particle system for generating a charged particle multi beam along a charged particle multi beam path, the charged particle system comprising:
   an aperture array in which is defined an array of apertures configured to generate from an upbeam charged particle source charged particle paths downbeam of the aperture array;
   a beam-limit array arranged downbeam of the aperture array and in which is defined an array of beam-limit apertures for shaping the charged particle multi beam path,
   a condenser lens system arranged between the aperture array and the beam-limit array, wherein the condenser lens system is configured to \operate at a rotation setting selected from of a number of rotation settings, the number of rotation settings being two or more, each rotation setting defining a different range of beam paths between the aperture array and the beam-limit array;
   wherein the apertures of the aperture array are configured so that, at each rotation setting of the condenser lens system, each beam-limit aperture of the beam-limit array lies on a charged particle beam path downbeam of the aperture array.

2. The charged particle system of claim 1, wherein the charged particle beam paths from the aperture array to the beam-limit array are dependent on the magnification applied to the charged particle beam paths between the aperture array and the beam-limit array.

3. The charged particle system of claim 1, wherein the charged particle beam paths from the aperture array to the beam-limit array are dependent on the rotation applied to the charged particle beam paths between the aperture array and the beam-limit array.

4. The charged particle system of claim 1, wherein the charged particle beam paths from the aperture array to the beam-limit array are dependent on the rotation and magnification applied to the charged particle beam paths between the aperture array and the beam-limit array, wherein the magnification and rotation are dependent on each other.

5. The charged particle system of claim 1, wherein at least two of the apertures of the aperture array define beam paths for multiple of the number of rotation settings from the aperture array to the beam-limit array.

6. The charged particle system of claim 1, wherein the condenser lens system is configured to adjust the magnification of the charged particle beam paths within a respective magnification sub-range for each rotation setting.

7. The charged particle system of claim 1, wherein the apertures of the aperture array form a pattern comprising a plurality of elongate slits and an optional central aperture.

8. The charged particle system of claim 7, wherein the elongate slits extend radially away from a center of the aperture array, optionally wherein the center is aligned with the central aperture.

9. The charged particle system of claim 7, wherein the pattern comprises a superposition of:
   a template pattern at a first rotation about the center and a first magnification, and the template pattern at a second rotation about the center and a second magnification.

10. The charged particle system of claim 9, wherein:
    the first magnification comprises a first sub-range of magnifications at the first rotation about the centre, and
    the second magnification comprises a second sub-range of magnifications at the second rotation about the centre.

11. The charged particle system of claim 9, wherein the template pattern comprises a square or hexagonal pattern of apertures, preferably a regular pattern, further preferably a pattern of circular apertures.

12. The charged particle system of claim 1, wherein the number of rotation settings comprises rotational offsets of 45 degrees with respect to each other or of 60 degrees with respect to each other.

13. The charged particle system of claim 1, wherein each aperture in the aperture array has the same shape as a corresponding aperture in the beam-limit array.

14. The charged particle system of claim 1, wherein the number of selectable rotation settings includes rotation settings other than a zero-rotation setting, preferably all rotation setting are different from a zero-rotation setting.

15. A charged particle system for generating a charged particle multi beam along a charged particle multi beam path, the charged particle system comprising:
    a charged particle source;
    a condenser lens system;
    a beam-limit array; and
    an aperture array comprising a center and a pattern of apertures, wherein the pattern comprises a superposition of:
    a template pattern at a first rotation about the center and a first magnification, and
    the template pattern at a second rotation about the center and a second magnification.

16. The charged particle system of claim 15, wherein:
    the first magnification comprises a first sub-range of magnifications at the first rotation about the center, and the second magnification comprises a second sub-range of magnifications at the second rotation about the center.

17. The charged particle system of claim 15, wherein the template pattern comprises a square or hexagonal pattern of apertures.

18. The charged particle system of claim 15, wherein each pair of i) the first rotation and the first magnification, ii) the second rotation and the second magnification, iii) optionally a respective further rotation and further magnification are a function of each other.

19. The charged particle system of claim 15, wherein the first rotation, the second rotation, and optionally the at least further rotation, are rotationally offset by 45 degrees or by 60 degrees.

20. A method of operating a charged particle system comprising an aperture array in which is defined an array of apertures, a beam-limit array arranged downbeam of the aperture array and in which is defined an array of beam-limit apertures, and a condenser lens system arranged between the aperture array and the beam-limit array, the method comprising:
- passing a charged particle beam through the apertures of the aperture array;
- operating the condenser lens system at two or more different rotation settings, each rotation setting defining a different beam path between the aperture array and the beam-limit array; and
- for each rotation setting, directing the charged particles from the aperture array through each of the beam-limit apertures of the beam-limit array.

* * * * *